(12) United States Patent
Threlfall

(10) Patent No.: US 12,402,743 B2
(45) Date of Patent: Sep. 2, 2025

(54) COFFEE FILTER HOLDER

(71) Applicant: John Threlfall, Volcano, HI (US)

(72) Inventor: John Threlfall, Volcano, HI (US)

( * ) Notice: Subject to any disclaimer, the term of this patent is extended or adjusted under 35 U.S.C. 154(b) by 735 days.

(21) Appl. No.: 17/750,371

(22) Filed: May 22, 2022

(65) Prior Publication Data
US 2022/0369846 A1    Nov. 24, 2022

Related U.S. Application Data

(60) Provisional application No. 63/192,103, filed on May 24, 2021.

(51) Int. Cl.
*A47J 31/02*    (2006.01)
*A47J 31/06*    (2006.01)

(52) U.S. Cl.
CPC ............... *A47J 31/02* (2013.01); *A47J 31/06* (2013.01)

(58) Field of Classification Search
CPC ......... A47J 31/02; A47J 31/06; A47J 31/005; A47J 31/0615; A47J 31/0626; A47J 45/02
USPC ......... 99/279, 285, 286, 295, 304, 306, 315, 99/316, 317, 323, 495; 426/77, 78, 84, 426/115, 132, 420, 433, 435, 594
See application file for complete search history.

(56) References Cited

U.S. PATENT DOCUMENTS

| | | | |
|---|---|---|---|
| 2004/0222147 A1* | 11/2004 | Post ..................... | A47J 31/02 210/493.1 |
| 2020/0288900 A1* | 9/2020 | Molnar ................. | A47J 31/02 |

* cited by examiner

*Primary Examiner* — Phuong T Nguyen
(74) *Attorney, Agent, or Firm* — Roger A. Jackson

(57) ABSTRACT

A coffee filter holder for a coffee filter element used with a coffee cup that has a base, a surrounding sidewall extending from the base, and the coffee cup surrounding sidewall terminating in a coffee cup rim defining a coffee cup interior, the coffee filter holder comprising a first surrounding sidewall, thus forming a cone shape about a first longitudinal axis for the first surrounding sidewall, a second surrounding sidewall about a second longwise axis that has an aperture disposed therethrough the second surrounding sidewall in two places along the first longitudinal axis such that the cone narrow end is disposed therethrough the aperture, with the second surrounding sidewall placed on a coffee cup rim with the wide end of the cone facing upward. Wherein the wide end of the cone received the coffee filter and ground coffee to pour hot water into that drips to the cup interior.

8 Claims, 18 Drawing Sheets

COFFEE FILTER HOLDER

RELATED PATENT APPLICATION

This patent application claims the benefit of U.S. provisional patent application Ser. No. 63/192,103 filed on May 24, 2021 by John Threlfall of Volcano, Hi., U.S.

FIELD OF THE INVENTION

The present invention generally relates to coffee accessories. More particularly, the present invention is used with a coffee holder preferably for one-cup service, i.e. to make a single cup at a time wherein the coffee filter holder supports a coffee filter over a single coffee cup to make a single cup of coffee.

DESCRIPTION OF THE RELATED ART

Cone shaped coffee filters are well known in the prior art typically being used with multiple cup coffee makers with ground coffee beans, it is a relatively new trend to make single cups of coffee with a typical cone shaped filter again using ground coffee beans, however, this left a need for single coffee cup cone filter holder or support, of which there are some products available is various configurations some of which are described in the prior art below, however, there not being many portable and collapsible single cup coffee filter holders.

Looking at the prior art in U.S. Pat. No. 4,519,911 to Shimizu, disclosed is a paper extractor including a support member in the form of a collar of a small wall-thickness having at its lower end two support legs facing each other, a filter attached to an inner surface of the support member, and coffee packs each including coffee powder sealed in a bag made of filter cloth or filter paper. The support legs in Shimizu of the support member are each formed with folds in the form of a letter V to allow the support legs to be deformed and project outwardly when they are bent at the folds, further by replacing the coffee pack by a new one, the paper extractor can be used several times before it is discarded, and the deformable support legs enable the paper extractor to be stably supported on the upper edge of a coffee cup.

Continuing in the prior art in U.S. Pat. No. 4,560,475 to Kataoka, disclosed is a filter assembly for providing a filtrate such as coffee has a sack of filter paper adhered to the back of a fold able support plate, the support plate is constituted by an intermediate portion with an opening for pouring hot water therethrough, which is covered by the filter sack, and a pair of support legs connected with the opposite sides of the intermediate portion to have the latter therebetween. Each support leg in Kataoka is formed with at least one slot which extends symmetrically with respect to the longitudinal centerline of the support plate to define a plurality of coactive locking members, which are firmly engageable with a receptacle to support the filter assembly upright in a stable manner when the support legs are folded relative to the intermediate portion along preselected fold lines, the locking members may be defined by a pair of slots or a single generally U-shaped slot at each support leg, for example.

Moving onward in the prior art in U.S. Pat. No. 5,290,444 to Campbell, disclosed is a device for securing a coffee filter paper in a grounds container comprising a single thin sheet of thermo-plastic, heat resistant, resilient material having a plurality of fingers spaced symmetrically around the periphery, for placing adjacent a paper filter with its open central core at the center of the filter and in combination wedged into a coffee grounds container with the instant invention exposed.

Continuing in the prior art in U.S. Pat. No. 5,852,966 to Hursh, disclosed is a coffee filter comprising a cylindrical coffee retaining ring, and a cylindrical sleeve, the cylindrical sleeve being sized, and fitted so that it may be slidably mounted upon the cylindrical coffee retaining ring so that the inner surface of the cylindrical sleeve is in close proximity with the outer surface of the cylindrical coffee retaining ring, and comprising a sleeve and filter retaining means, that is fixedly attached to the cylindrical coffee retaining ring and to the cylindrical sleeve. The means in Hursh being capable upon such slidable mounting of the cylindrical sleeve of fixedly attaching the cylindrical sleeve to the cylindrical coffee retaining ring, and being capable of retaining a sheet of filter paper so that such paper underlies and spans across the lower end of the cylindrical coffee retaining ring.

Further, in the prior art in U.S. Pat. No. 6,425,317 to Simmons, disclosed is a filter basket having a wall configured to form a basket, the wall has a drain hole formed in a lower portion thereof and a regulating member for regulating a flow of liquid flowing through the basket into the drain hole. One embodiment in Simmons includes a pair of planar surfaces positioned within the basket and connected to an inner surface of the wall; the pair of planar surfaces define a longitudinal slot therebetween. The size of the slot in Simmons is configured to restrict the flow of fluid through the basket to maintain a predetermined level of fluid within the basket for a predetermined dwell period of about five minutes to about seven minutes. In Simmons, a method of brewing a beverage is also disclosed including the steps of placing a plurality of beverage flavor elements within a filter basket, dispensing water over the plurality of beverage flavor elements within the filter basket at a predetermined flow rate, providing structure within the filter basket to restrict the flow of water through the filter basket such that a level of water in the basket rises to a predetermined level at which the flow rate of water into the filter basket equals a flow rate of water out of the basket, and continuing dispensing water over the plurality of beverage flavor elements for a predetermined dwell period after the flow rate of water into the filter basket equals the flow rate of water out of the basket.

Next, in the prior art in U.S. Pat. No. 7,150,219 to DeLonghi, disclosed is a coffee machine that has a filter holder receiving a filter cup adapted to hold a suspension of hot water and grounds on a generally horizontal filter forming a floor of the cup. The hot water infused by Delonghi has the grounds passed down through the filter as coffee, a side wall formed with a screw-thread is provided on the cup underneath and generally perpendicular to the filter. A dispenser on the cup on DeLonghi is underneath the filter has an outlet directed generally perpendicularly at the side wall for spraying the coffee substantially perpendicularly against the screw-thread and thereby generating froth.

Moving onward, in the prior art in U.S. Pat. No. 8,906,440 to Otto, disclosed is a coffee filter basket includes a filter retainer having an outer shell with an upper end having open top and a bottom including an opening, an insert having an upper collar of a less than the diameter than the upper end of the retainer to fit therein and having a lower extension which when a filter is disposed within the retainer. The insert in Otto is disposed within the filter insert press-fits within the retainer to retain the filter adjacent the retainer shell, and a removable top having an outer perimeter lip portion of at least that of the diameter of the upper end of the retainer and a lower collar portion of a diameter less than the diameter of the upper collar and configured to press-fit therein to secure the insert in the retainer, wherein the removable top has an opening, wherein a method of use is provided.

Continuing, in the prior art in U.S. Pat. No. 10,051,987 to Bebo, disclosed is a tea and coffee brewing apparatus includes a container for receiving a brewed beverage and a filter receptacle for receiving contents to be brewed. Guides in Bebo are disposed on the filter receptacle for lowering the filter receptacle wholly inside the container for storage mode and also raising the filter receptacle above the container for brew mode. Supports in Bebo are disposed on the guides hold the filter receptacle up and above the container so that a beverage may be drip brewed into the container.

Continuing, in the prior art in U.S. Pat. No. 10,144,580 to Schwarz, disclosed is a brew basket is provided for use in a beverage brewing machine, the brew basket includes a body defining a brewing reservoir that extends along a longitudinal length from an open top to a bottom end having one or more openings. The brewing reservoir in Schwarz has an internally tapered multi-sided three-dimensional (3D) shape, the brewing reservoir having a first cross-sectional area at the open top that progressively narrows along the longitudinal length of the multi-sided 3D shape to a smaller second cross-sectional area proximate to the one or more openings at the bottom end. The open top in Schwarz is configured to receive heated water from the brewing machine during a brewing operation with brewed beverage discharging from the one or more openings. The multi-sided 3D shape of the brewing reservoir configured to receive a filter pack having a generally tapered multi-sided 3D shape similar to the multi-sided 3D shape of the brewing reservoir.

Next, in the prior art in U.S. Design Pat. No. D250,804 to Nilsson, disclosed is a coffee filter holder that has the traditional conic shape.

Further, in the prior art in U.S. Design Pat. No. D406,725 to Joergensen, disclosed is a single cup coffee filter holder that has a cylindrical shape that inserts into a single coffee cup.

What is needed is a coffee filter holder that is portable, being collapsible and potentially pocketable to be easily carried by an individual to be used at either their favorite coffee shop, on the road hiking/camping, or simply at home. The coffee filter holder would preferably not be disposable and would be reusable, with the ability to hold its desired shape for re-use.

SUMMARY OF INVENTION

Broadly, the present invention is a coffee filter holder for supporting a coffee filter element for use with a single serving coffee cup that has a base, a coffee cup surrounding sidewall extending from the base, and the coffee cup surrounding sidewall terminating in a coffee cup rim all defining a coffee cup interior, the coffee filter holder comprising a first surrounding sidewall including a first outer surface and an opposing first inner surface, further the first surrounding sidewall having a first proximal end portion and an opposing first distal end portion with a first longitudinal axis spanning therebetween. Wherein the first proximal end portion has a first proximal peripheral margin that defines a first proximal termination of the first surrounding sidewall, wherein the first proximal peripheral margin has a first proximal peripheral distance, further the first distal end portion has a first distal peripheral margin that defines a first distal termination of the first surrounding sidewall. Wherein the first distal peripheral margin has a first distal peripheral distance, further the first distal peripheral distance is greater that the first proximal peripheral distance thus forming a cone shape for the first surrounding sidewall, wherein the first inner surface, the first proximal peripheral margin, and the first distal peripheral margin all define a first surrounding sidewall interior.

Further, the coffee holder includes a second surrounding sidewall including a second outer surface and an opposing second inner surface, further the second surrounding sidewall having a second primary end portion and an opposing second secondary end portion with a second longwise axis spanning therebetween. Wherein the first longitudinal axis and the second longwise axis are positioned perpendicular to one another as the second surrounding sidewall has an aperture disposed therethrough the second surrounding sidewall in two places along the first longitudinal axis such that the first proximal end portion is partially received in the aperture. Wherein operationally a portion of the second surrounding sidewall second outer surface rests against the coffee cup rim thus suspending the first surrounding sidewall over the coffee cup interior with the first proximal peripheral margin adjacent to the coffee cup interior, wherein the coffee filter element is placed within the first surrounding sidewall interior with ground coffee placed within the coffee filter element and hot water poured over the ground coffee to create a single cup of coffee.

These and other objects of the present invention will become more readily appreciated and understood from a consideration of the following detailed description of the exemplary embodiments of the present invention when taken together with the accompanying drawings, in which;

REFERENCE NUMBERS IN DRAWINGS

Figure 1:
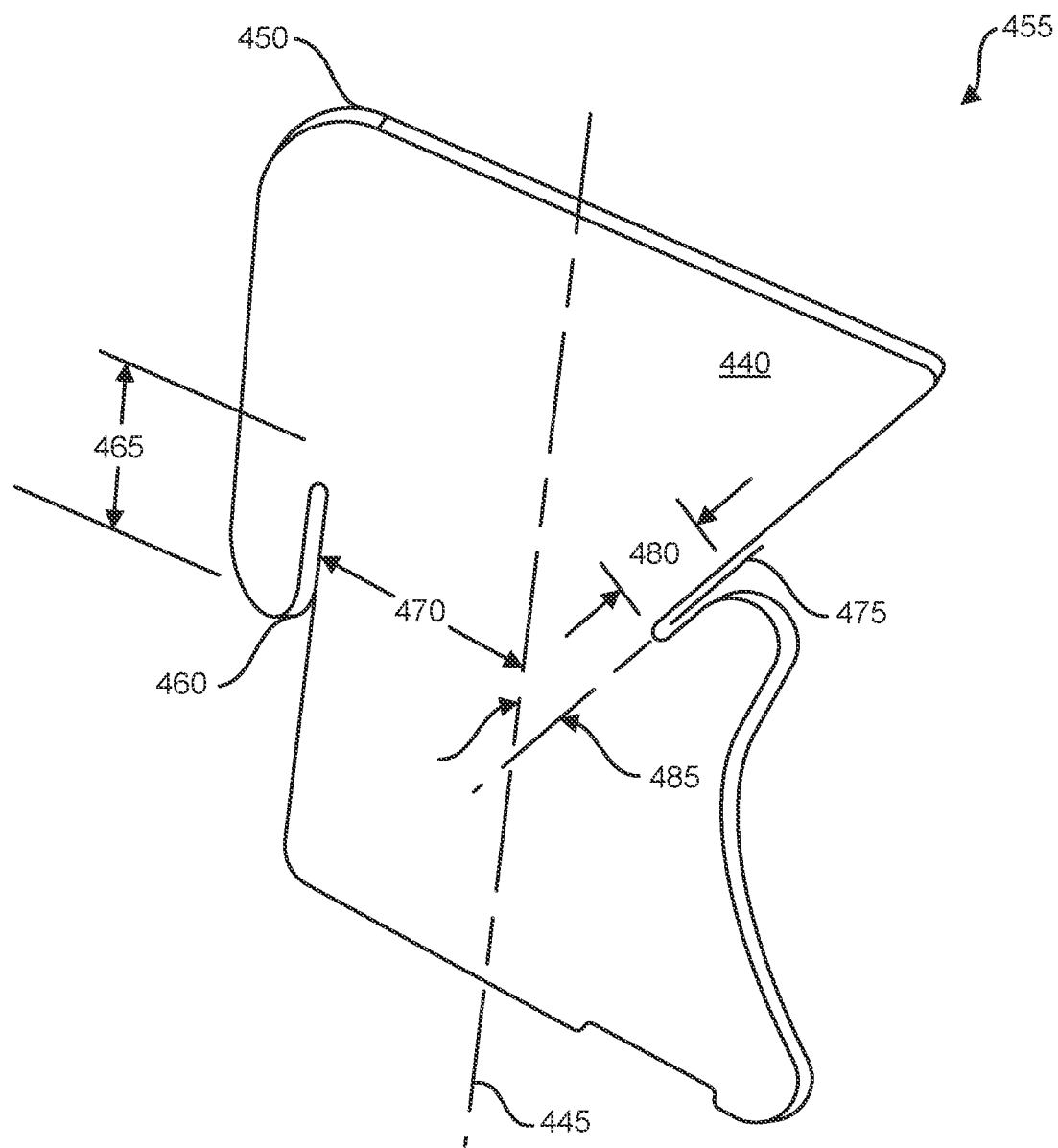
FIG. 1 shows an upper perspective view of the planar element that includes the parallel first and second slots forming a single side of the coffee filter holder.

50 Coffee filter holder
55 Coffee filter element
60 Ground coffee
65 Hot water
70 A single serving coffee cup
75 Base of the coffee cup 70
80 Surrounding sidewall of the coffee cup 70
85 Coffee cup rim of the surrounding sidewall 80
90 Interior of the coffee cup 70
95 First surrounding sidewall
100 First outer surface of the first surrounding sidewall 95
105 First inner surface of the first surrounding sidewall 95
110 First proximal end portion of the first surrounding sidewall 95
115 First distal end portion of the first surrounding sidewall 95
120 First longitudinal axis of the first surrounding sidewall 95
125 First proximal peripheral margin of the first surrounding sidewall 95
130 First proximal termination of the first surrounding sidewall 95
135 First proximal peripheral distance of the first surrounding sidewall 95
140 First distal peripheral margin of the first surrounding sidewall 95
145 First distal termination of the first surrounding sidewall 95
150 First distal peripheral distance of the first surrounding sidewall 95
155 First distal peripheral distance is greater that the first proximal peripheral distance 135
160 Cone shape for the first surrounding sidewall 95
165 First surrounding sidewall interior
170 Second surrounding sidewall
175 Second outer surface of the second surrounding sidewall 170
180 Second inner surface of the second surrounding sidewall 170
185 Second primary end portion of the second surrounding sidewall 170
190 Second secondary end portion of the second surrounding sidewall 170
195 Second longwise axis of the second surrounding sidewall 170
200 Perpendicular position of the first longitudinal axis 120 and the second longwise axis 195
205 Aperture of the second surrounding sidewall 170 disposed therethrough in two places along the first longitudinal axis 120
210 The first proximal end portion is partially received in the aperture 205
215 Portion of the second surrounding sidewall 170 second outer surface 175 rests against the coffee cup rim 85 thus suspending the first surrounding sidewall 95 over the coffee cup interior 90 with the first proximal peripheral margin 125 adjacent to the coffee cup interior 90
220 Placing the coffee filter element 55 within the first surrounding sidewall interior 165 with the ground coffee 60 placed within the coffee filter element 55 and the hot water 65 poured over the ground coffee 60 to create a single cup of coffee
225 Third surrounding sidewall
230 Third outer surface of the third surrounding sidewall 225
235 Third inner surface of the third surrounding sidewall 225
240 Third proximal end portion of the third surrounding sidewall 225
245 Third distal end portion of the third surrounding sidewall 225

250 Third longitudinal axis of the third surrounding sidewall 225
255 Third proximal peripheral margin of the third surrounding sidewall 225
260 Third proximal termination of the third surrounding sidewall 225
265 Third proximal peripheral distance of the third surrounding sidewall 225
270 Third distal peripheral margin of the third surrounding sidewall 225
275 Third distal termination of the third surrounding sidewall 225
280 Third distal peripheral distance of the third surrounding sidewall 225
285 Third distal peripheral distance 280 is greater than the third proximal peripheral distance 265
290 Cone shape for the third surrounding sidewall 225
295 Third surrounding sidewall 225 interior
300 Planar member
305 Planar plane of the planar member 300
310 Outer perimeter of the planar member 300
315 Planar aperture of the planar member 300 disposed therethrough the planar member 300
320 Perpendicular position of the third longitudinal axis 250 and the planar plane 305
325 Partial receiving of the third proximal end portion 240 in the planar aperture 315
330 Portion of the planar member 300 rests against the coffee cup rim 85 thus suspending the third surrounding sidewall 225 over the coffee cup interior 90 with the third proximal peripheral margin 255 adjacent to the coffee cup interior 90, wherein the coffee filter element 55 is placed within the third surrounding sidewall interior 295 with ground coffee 60 placed within the coffee filter element 55 and hot water 65 poured over the ground coffee 60 to create a single cup of coffee
335 Flexible fourth surrounding sidewall
340 Fourth outer surface of the flexible fourth surrounding sidewall 335
345 Fourth inner surface of the flexible fourth surrounding sidewall 335
350 Fourth proximal end portion of the flexible fourth surrounding sidewall 335
355 Fourth distal end portion of the flexible fourth surrounding sidewall 335
360 Fourth longitudinal axis of the flexible fourth surrounding sidewall 335
365 Fourth proximal peripheral margin of the flexible fourth surrounding sidewall 335
370 Fourth proximal termination of the fourth surrounding sidewall 335
375 Fourth proximal peripheral distance of the flexible fourth surrounding sidewall 335
380 Fourth distal peripheral margin of the flexible fourth surrounding sidewall 335
385 Fourth distal termination of the fourth surrounding sidewall 335
390 Fourth distal peripheral distance of the flexible fourth surrounding sidewall 335
395 Fourth distal peripheral distance 390 is greater than the fourth proximal peripheral distance 375
400 Forming a cone shape for the fourth surrounding sidewall 335
405 Fourth surrounding sidewall interior
410 Fourth surrounding sidewall forms a hexagonal pyramid in shape
415 Six fold lines in the fourth surrounding sidewall 335
420 Each fold line running substantially parallel to the fourth longitudinal axis 360
425 Fold flat of the flexible fourth surrounding sidewall 335
430 At least one of the fold lines 415 has a projection of excess of the fourth surrounding sidewall 335 outside of the hexagonal pyramid shape 410 to facilitate the fourth surrounding sidewall 335 to fold flat for transportation and storage
435 Rest of a portion of the fourth proximal end portion 350 against the coffee cup rim 85 thus suspending the fourth surrounding sidewall 335 over the coffee cup interior 90 with the fourth proximal peripheral margin 365 adjacent to the coffee cup interior 90, wherein the coffee filter element 55 is placed within the fourth surrounding sidewall interior 405 with ground coffee 60 placed within the coffee filter element 55 and hot water 65 poured over the ground coffee 60 to create a single cup of coffee
440 Planar element
445 Lengthwise axis of the planar element 440
450 Outer perimeter of the planar element 440
455 Polygon shape of the outer perimeter 450
460 Partial first slot therethrough the planar element 440
465 First length of the partial first slot 460
470 Substantially parallel relationship of the first length 465 to the lengthwise axis 445
475 Partial second slot therethrough the planar element 440
480 Second length of the partial second slot 475
485 Acute angle of the partial second slot 475 to the lengthwise axis 445
490 Fifth surrounding sidewall
495 Engaging the first slot 460 and the second slot 475 to one another on separate planar elements 440 such that the fifth surrounding sidewall 490 is formed by at least three of the planar elements 440
500 Fifth outer surface of the fifth surrounding sidewall 490
505 Fifth inner surface of the fifth surrounding sidewall 490
510 Fifth proximal end portion of the fifth surrounding sidewall 490
515 Fifth distal end portion of the fifth surrounding sidewall 490
520 Fifth longitudinal axis of the fifth surrounding sidewall 490
525 Fifth proximal peripheral margin of the fifth surrounding sidewall 490
530 Fifth proximal termination of the fifth surrounding sidewall 490
535 Fifth proximal peripheral distance of the fifth surrounding sidewall 490
540 Fifth distal peripheral margin of the fifth surrounding sidewall 490
545 Fifth distal termination of the fifth surrounding sidewall 490
550 Fifth distal peripheral distance of the fifth surrounding sidewall 490
555 Cone shape of the fifth surrounding sidewall 490
560 Fifth distal peripheral distance 550 is greater than the fifth proximal peripheral distance 535 thus forming the cone shape 555 for the fifth surrounding sidewall 490
565 Interior of the fifth surrounding sidewall 490
570 A portion of the fifth proximal end portion 510 rests against the coffee cup rim 85 thus suspending the fifth surrounding sidewall 490 over the coffee cup interior 90 with the fifth proximal peripheral margin 525 adjacent to the coffee cup interior 90, wherein the coffee filter element 55 is placed within the fifth surrounding sidewall interior 565 with ground coffee 60 placed within the coffee filter element 55 and hot water 65 poured over the ground coffee 60 to create a single cup of coffee 575 Interface aperture disposed in the third proximal end portion 240 of the third surrounding sidewall 225 to receive a portion of the planar aperture 315

DETAILED DESCRIPTION

Figure 2:
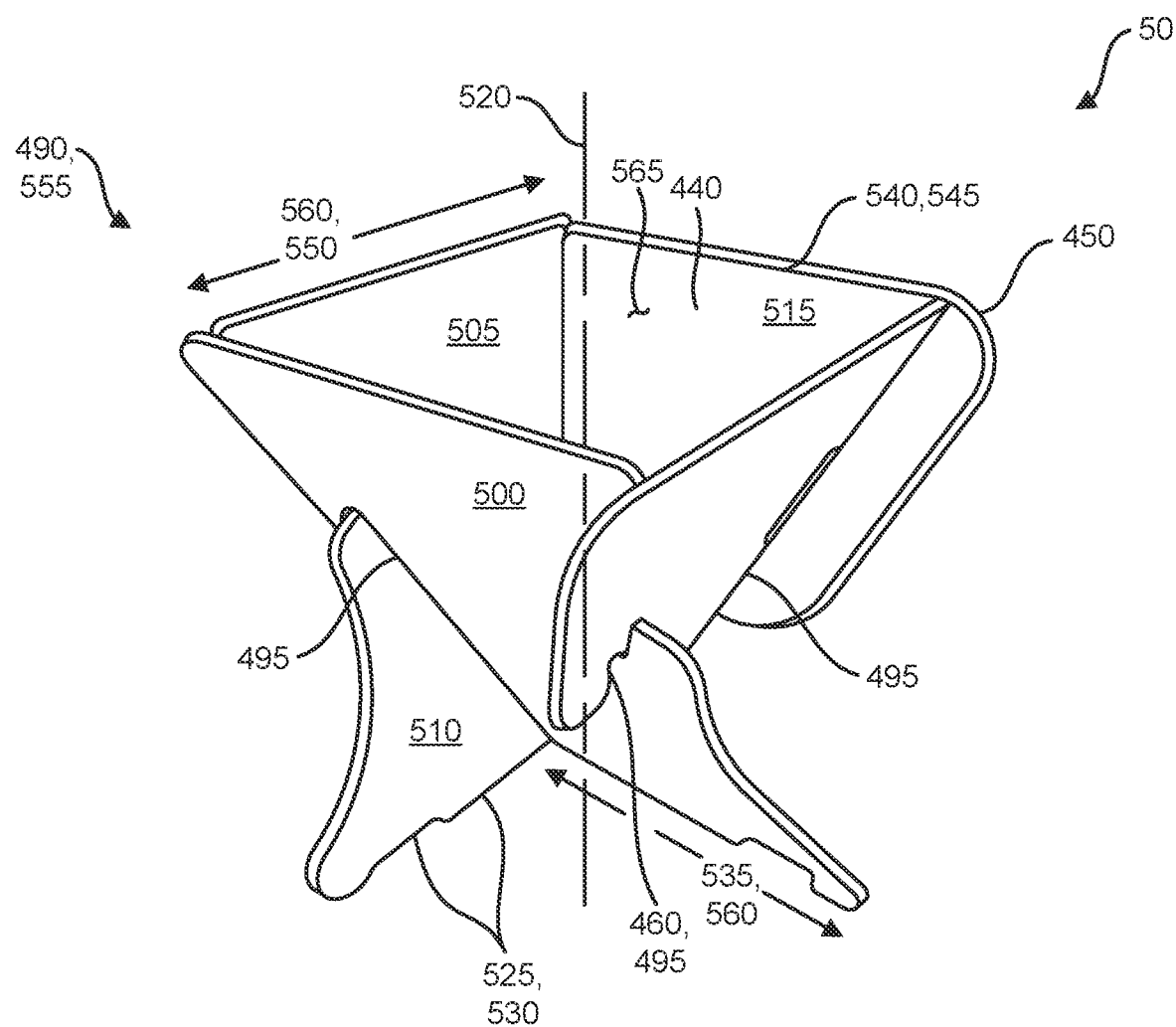
FIG. 2 shows an upper perspective view of four planar elements interconnected with one another to form a cone shape for a fifth surrounding sidewall that includes the fifth proximal end portion that terminates into the support foot shown.

With initial reference to FIG. 1 shown is FIG. 1 shows an upper perspective view of the planar element 440 that includes the parallel first 460 and second 475 slots forming a single side of the coffee filter holder 50. Next, FIG. 2 shows an upper perspective view of four planar elements 440 interconnected with one another to form a cone shape for a fifth surrounding sidewall 490 that includes the fifth proximal end portion 510 that terminates 530 into the support foot shown.

Figure 3:
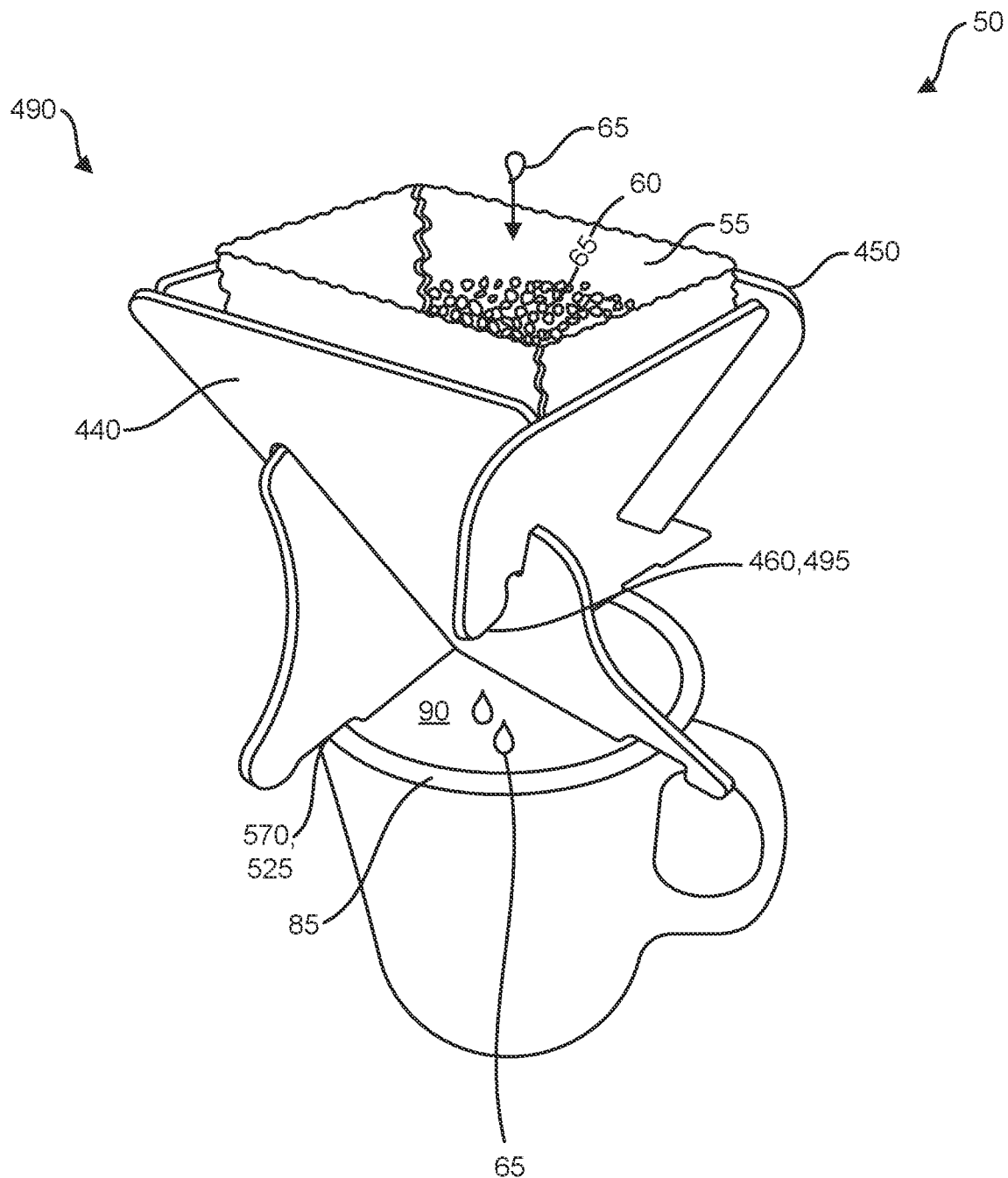
FIG. 3 shows an upper perspective use view of the four planar elements interconnected with one another to form a cone shape for a fifth surrounding sidewall that includes the fifth proximal end portion that terminates into the support foot shown that are disposed upon the coffee cup rim with the coffee filter, ground coffee, and hot water shown dripping into the interior of the coffee cup after passing through the ground coffee and coffee filter.

Continuing, FIG. 3 shows an upper perspective use view of the four planar elements 440 interconnected with one another to form a cone shape for a fifth surrounding sidewall 490 that includes the fifth proximal end portion 510 that terminates 530 into the support foot shown that are disposed upon the coffee cup 70 rim 85 with the coffee filter 55, ground coffee 60, and hot water 65 shown dripping into the interior 90 of the coffee cup 70 after passing through the ground coffee 60 and coffee filter 55.

Figure 4:
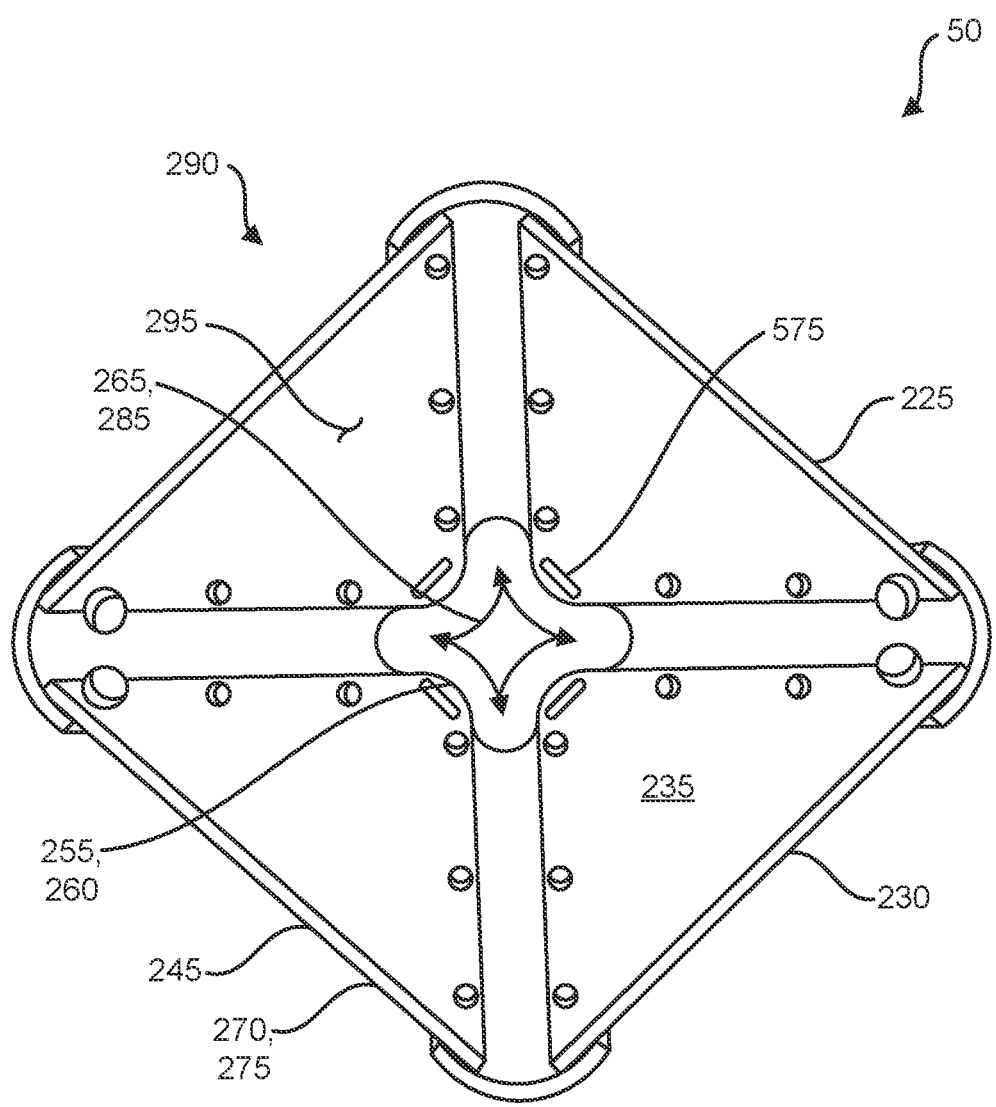
FIG. 4 shows a top view of the coffee filter holder with the third surrounding sidewall interior without the planar member shown for clarity, with the third proximal peripheral distance shown at the bottom of the third surrounding sidewall.
Figure 5:
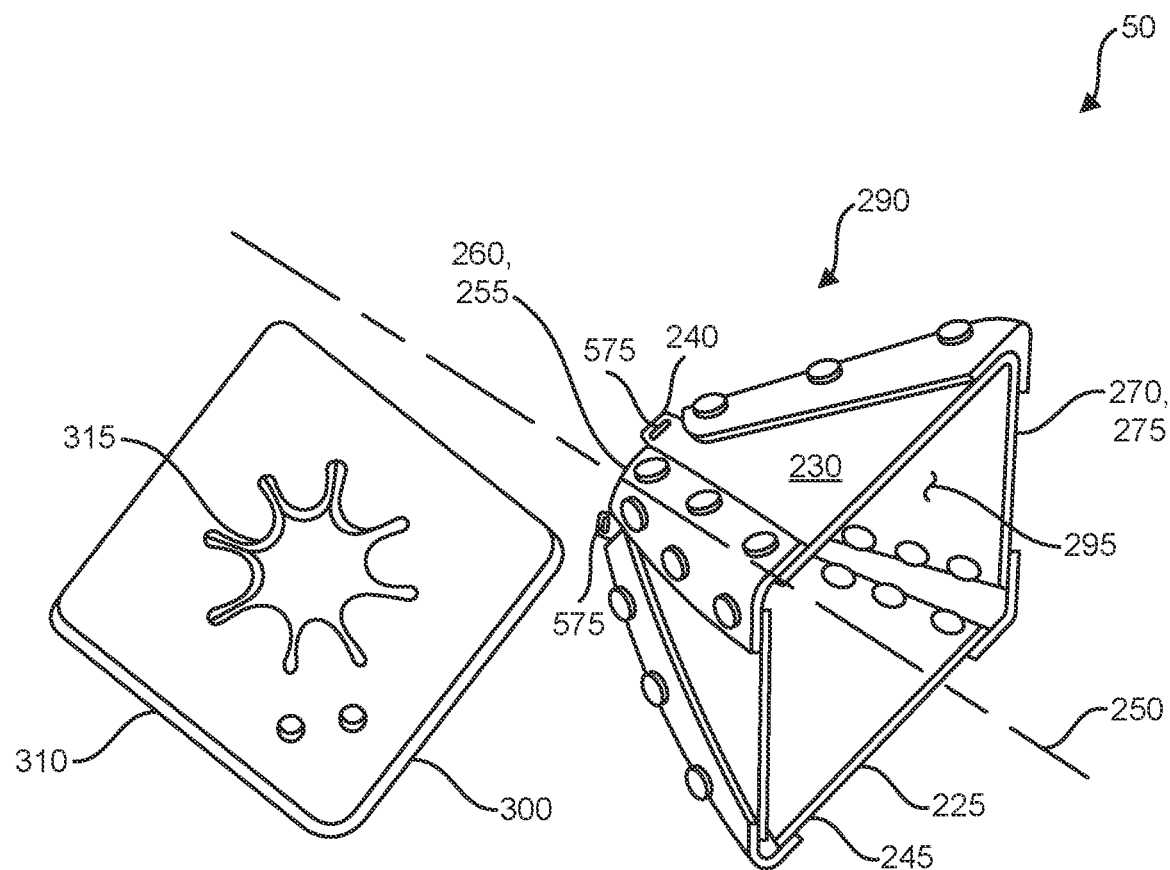
FIG. 5 shows a perspective view of the coffee filter holder with the third surrounding sidewall interior with the planar member shown separate for clarity, with the third proximal termination/margin shown at the bottom of the third surrounding sidewall.

Further, FIG. 4 shows a top view of the coffee filter holder 50 with the third surrounding sidewall 225 interior 295 without the planar member 300 shown for clarity, with the third proximal peripheral distance 265 shown at the bottom of the third surrounding sidewall 225. Next, FIG. 5 shows a perspective view of the coffee filter holder 50 with the third surrounding sidewall 225 interior 295 with the planar member 300 shown separate for clarity, with the third proximal termination 260/margin 255 shown at the bottom of the third surrounding sidewall 225.

Figure 6:
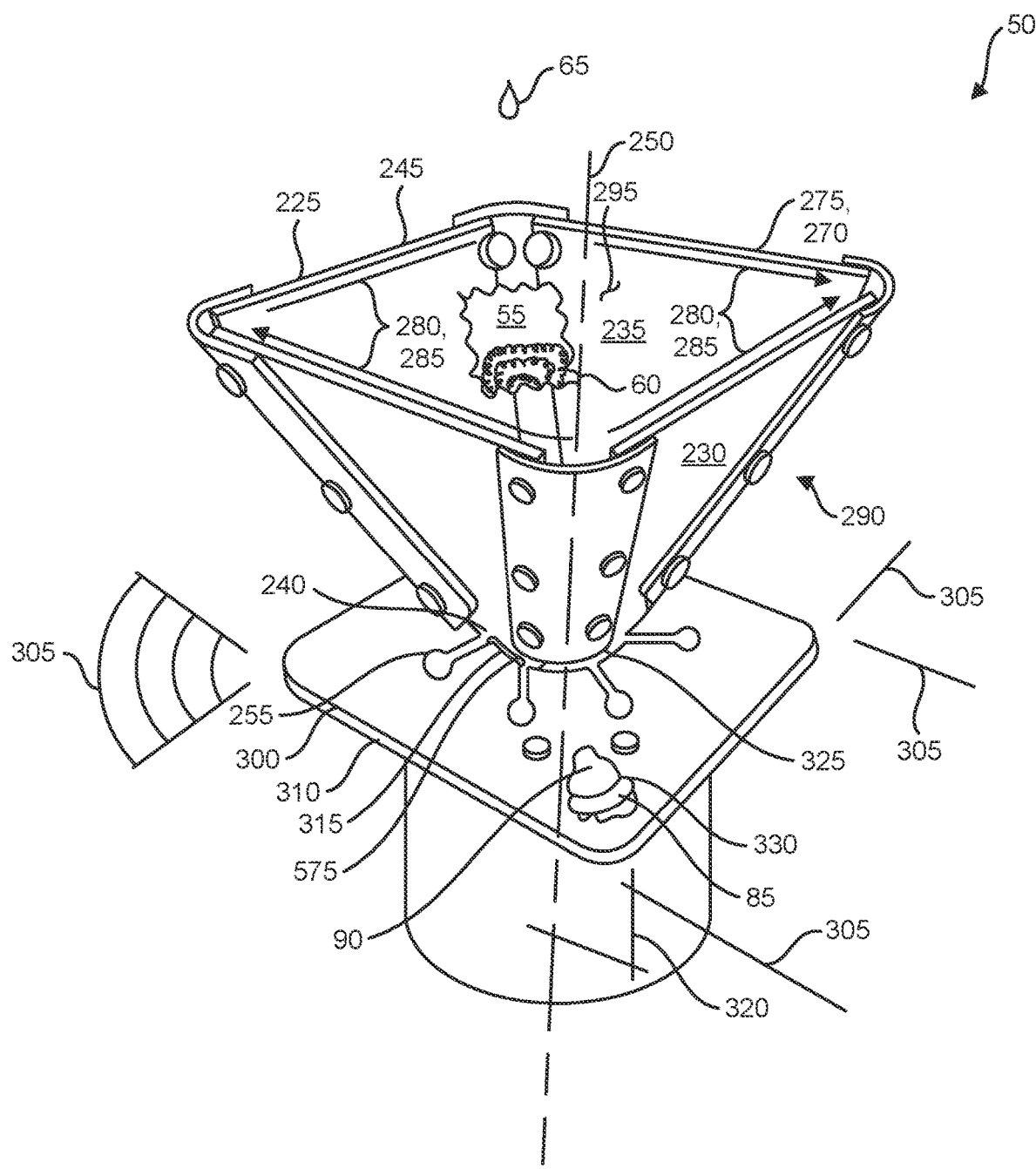
FIG. 6 shows a perspective use view of the coffee filter holder with the third surrounding sidewall with coffee and filter disposed in the interior with the planar member shown engaging the third proximal end portion of the third surrounding sidewall as the planar member rests on top of the coffee cup with the interior of the coffee cup also shown.

Continuing, FIG. 6 shows a perspective use view of the coffee filter holder 50 with the third surrounding sidewall 225 with round coffee 60 and filter 55 disposed in the interior 295 with the planar member 300 shown engaging the third proximal end portion 240 of the third surrounding sidewall 225 as the planar member 300 rests on top 85 of the coffee cup 70 with the interior 90 of the coffee cup 70 also shown.

Figure 7:
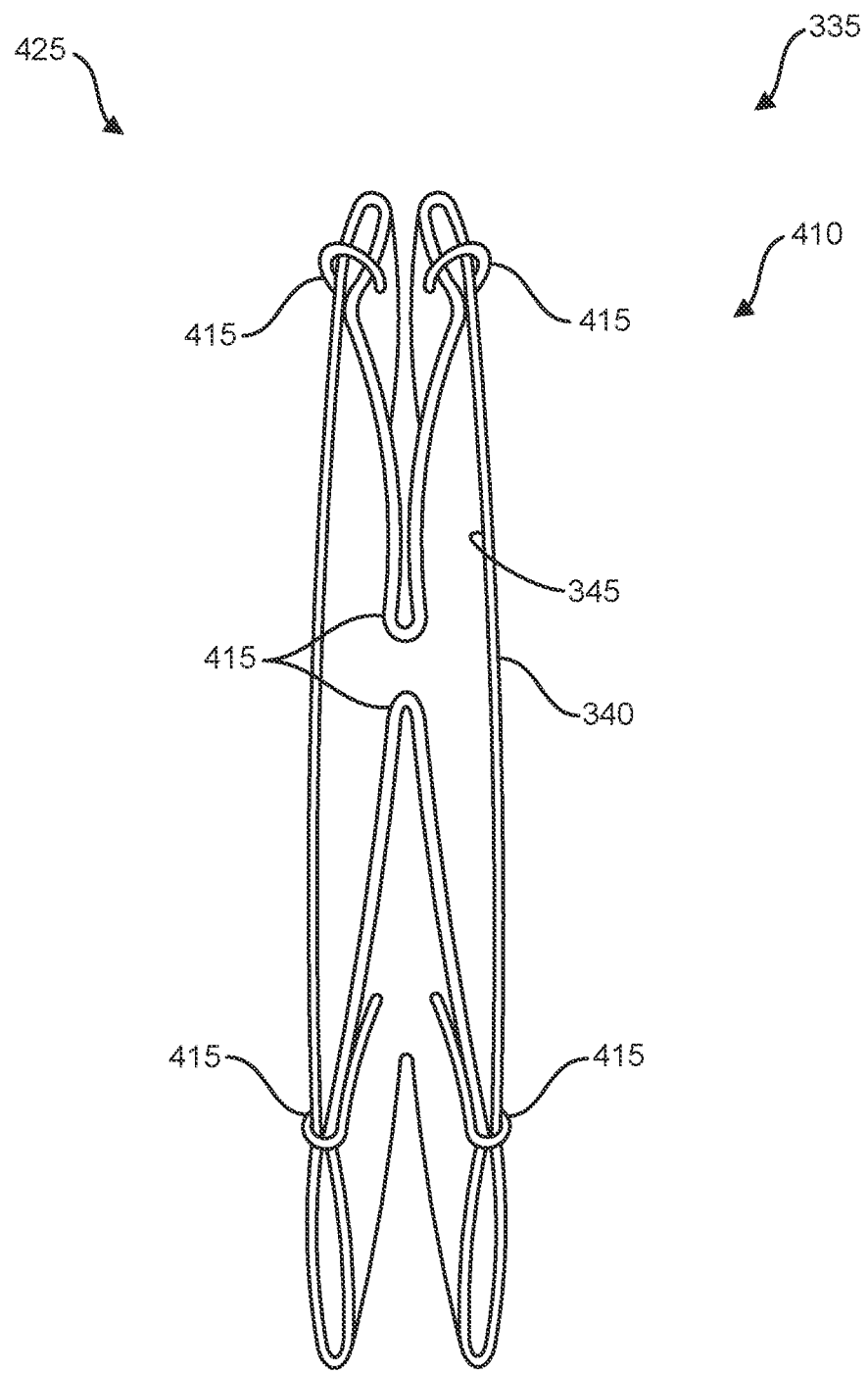
FIG. 7 shows a top view of the fourth surrounding sidewall collapsed or folded flat for portability with the bending along the fold lines.
Figure 8:
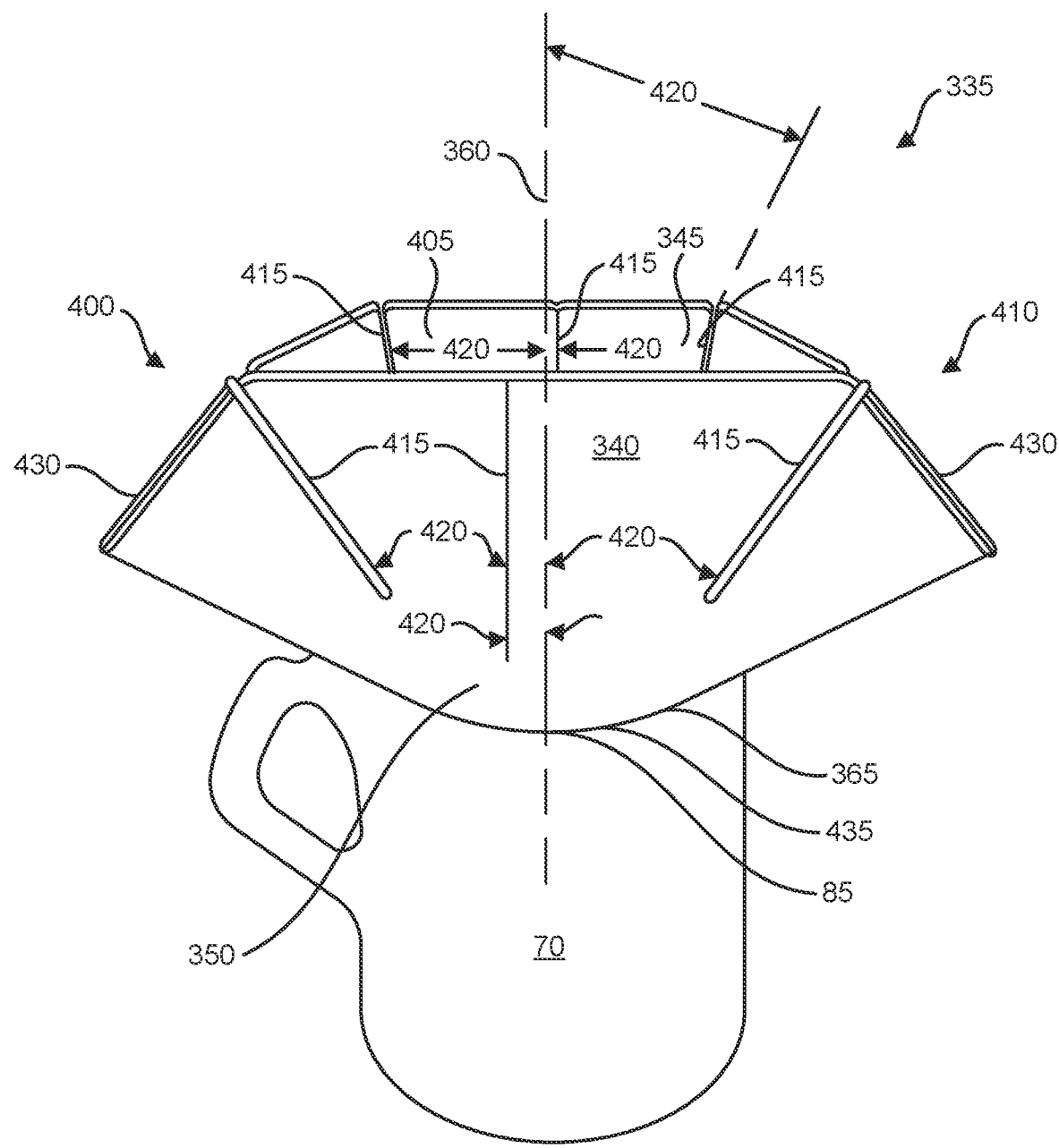
FIG. 8 shows a side elevation use view of the fourth surrounding sidewall opened and disposed upon the coffee cup.
Figure 9:
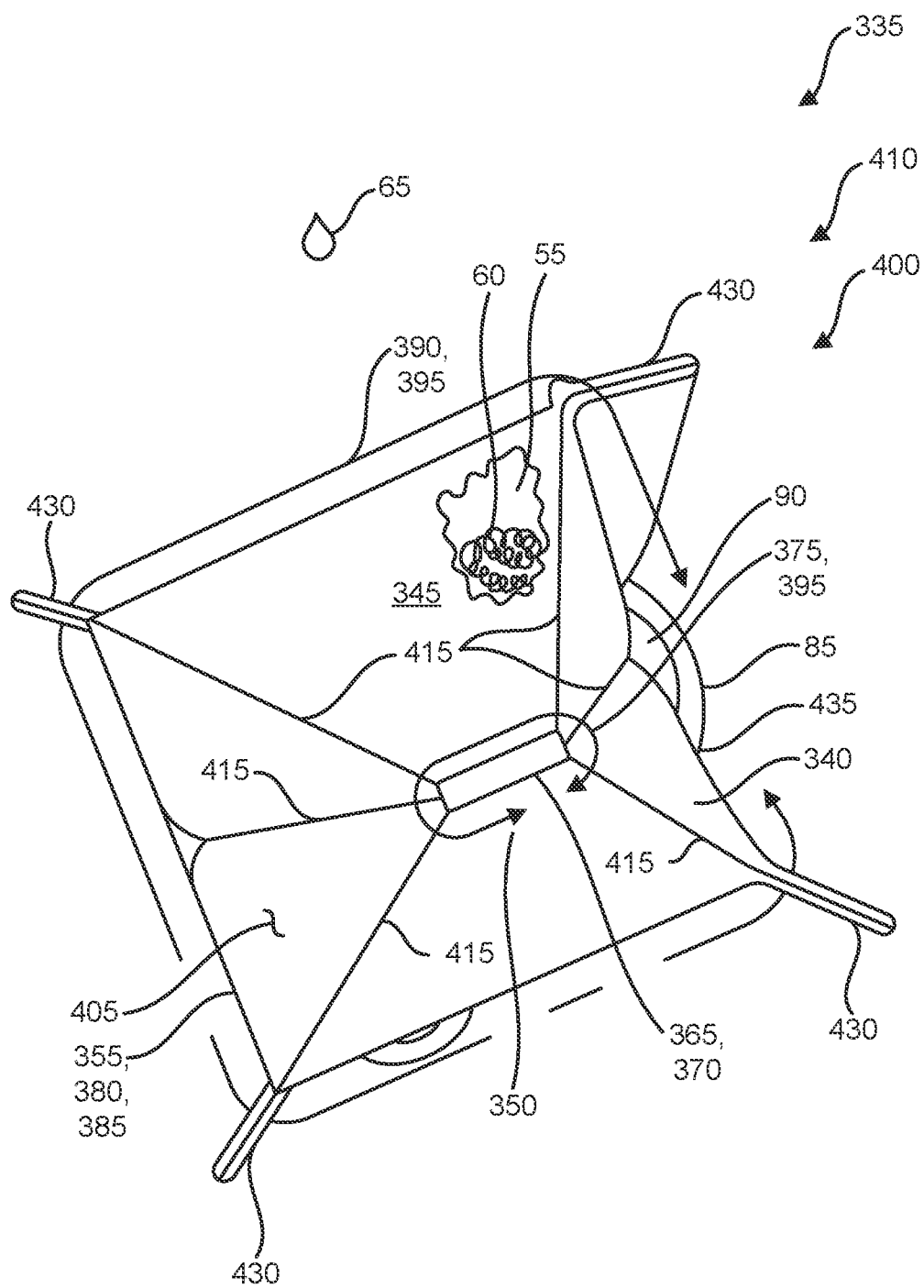
FIG. 9 shows a top use view of the fourth surrounding sidewall opened and disposed upon the coffee cup, wherein shown is the coffee filter element, the ground coffee, with the fourth proximal peripheral margin that communication with the coffee cup interior.
Figure 10:
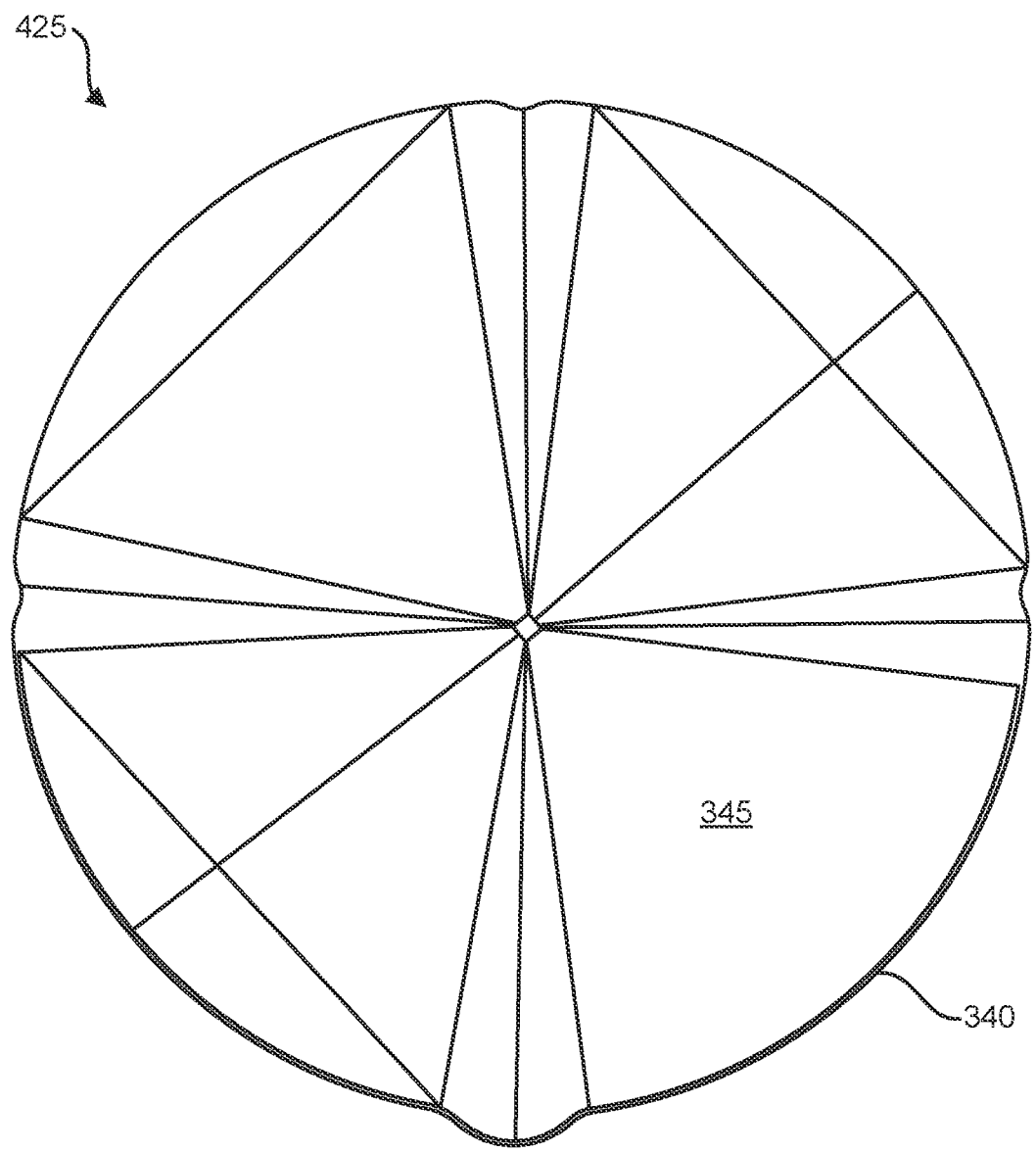
FIG. 10 shows a flat plan top fold flat view of the fourth surrounding sidewall showing the fourth outer surface and the fourth inner surface.

Next, FIG. 7 shows a top view of the fourth surrounding sidewall 335 collapsed or folded flat for portability with the bending along the fold lines 415. Continuing, FIG. 8 shows a side elevation use view of the fourth surrounding sidewall 335 opened and disposed upon the coffee cup 70 rim 85. Further, FIG. 9 shows a top use view of the fourth surrounding sidewall 335 opened and disposed upon the coffee cup 70, wherein shown is the coffee filter element 55, the ground coffee 60, with the fourth proximal peripheral margin 365 that is in communication with the coffee cup interior 90. Next, FIG. 10 shows a flat plan top fold flat view of the fourth surrounding sidewall 335 showing the fourth outer surface 340 and the fourth inner surface 345.

Figure 11:
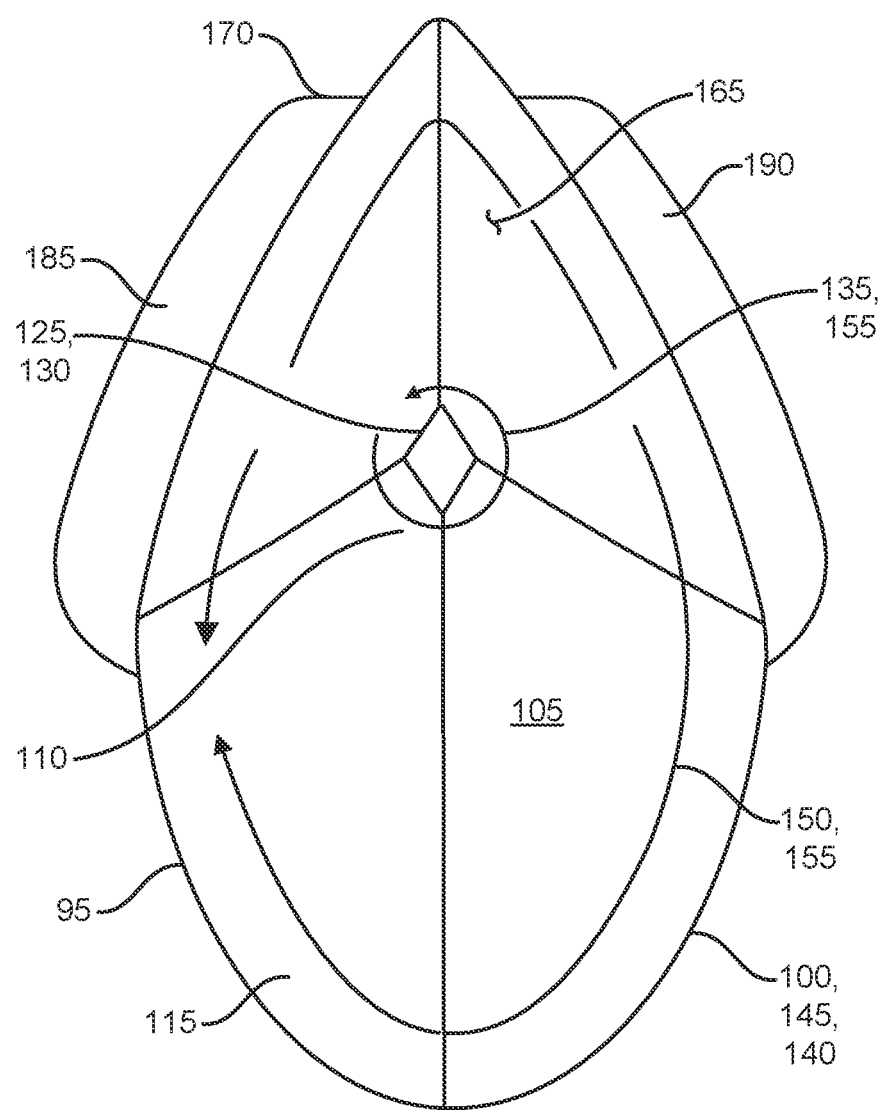
FIG. 11 shows a top view of the first and second surrounding sidewalls of the coffee filter holder, also showing the first proximal peripheral margin and termination of the first surrounding sidewall.
Figure 12:
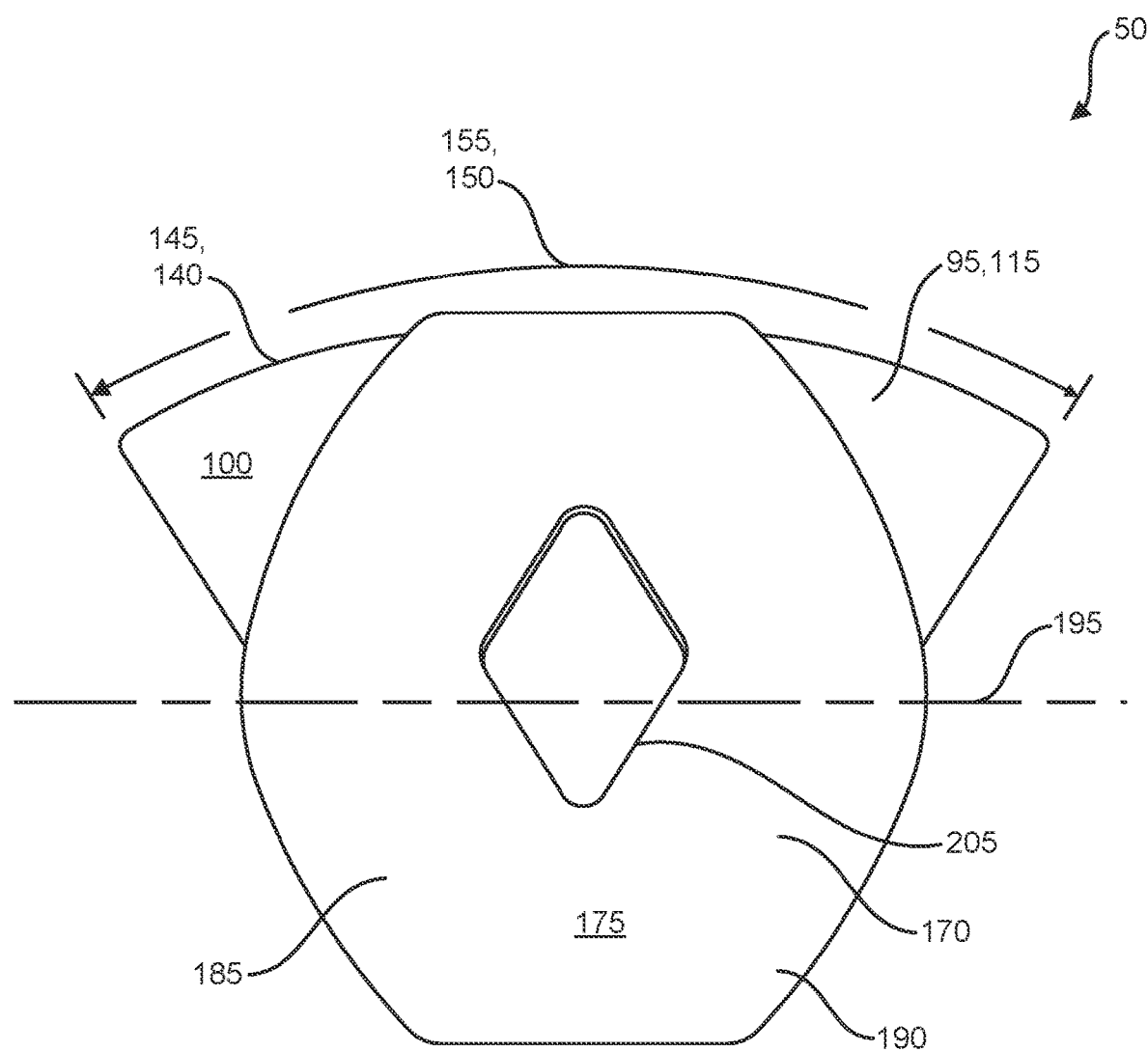
FIG. 12 shows a flat plan view of the first and second surrounding sidewalls of the coffee filter holder that are shown assembled together for portability.
Figure 13:
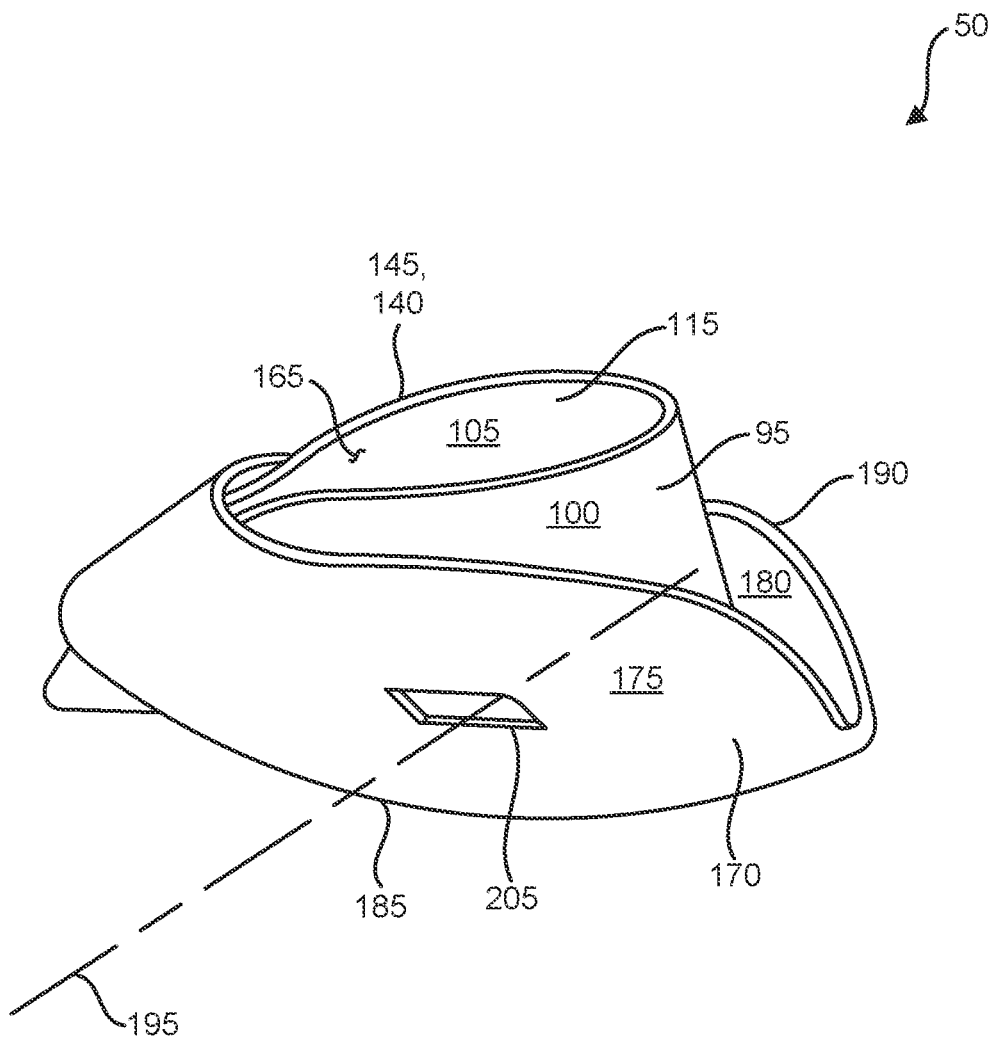
FIG. 13 shows a perspective view of FIG. 12, with FIG. 13 showing the first and second surrounding sidewalls of the coffee filter holder that are shown assembled together for portability with the aperture of the second surrounding sidewall.

Further, FIG. 11 shows a top view of the first 95 and second 170 surrounding sidewalls of the coffee filter holder 50, also showing the first proximal peripheral margin 125 and proximal termination 130 of the first surrounding sidewall 95. Next, FIG. 12 shows a flat plan view of the first 95 and second 170 surrounding sidewalls of the coffee filter holder 50 that are shown assembled together for portability. Continuing, FIG. 13 shows a perspective view of FIG. 12, with FIG. 13 showing the first 95 and second 170 surrounding sidewalls of the coffee filter holder 50 that are shown assembled together for portability with the aperture 205 of the second surrounding sidewall 170.

Figure 14:
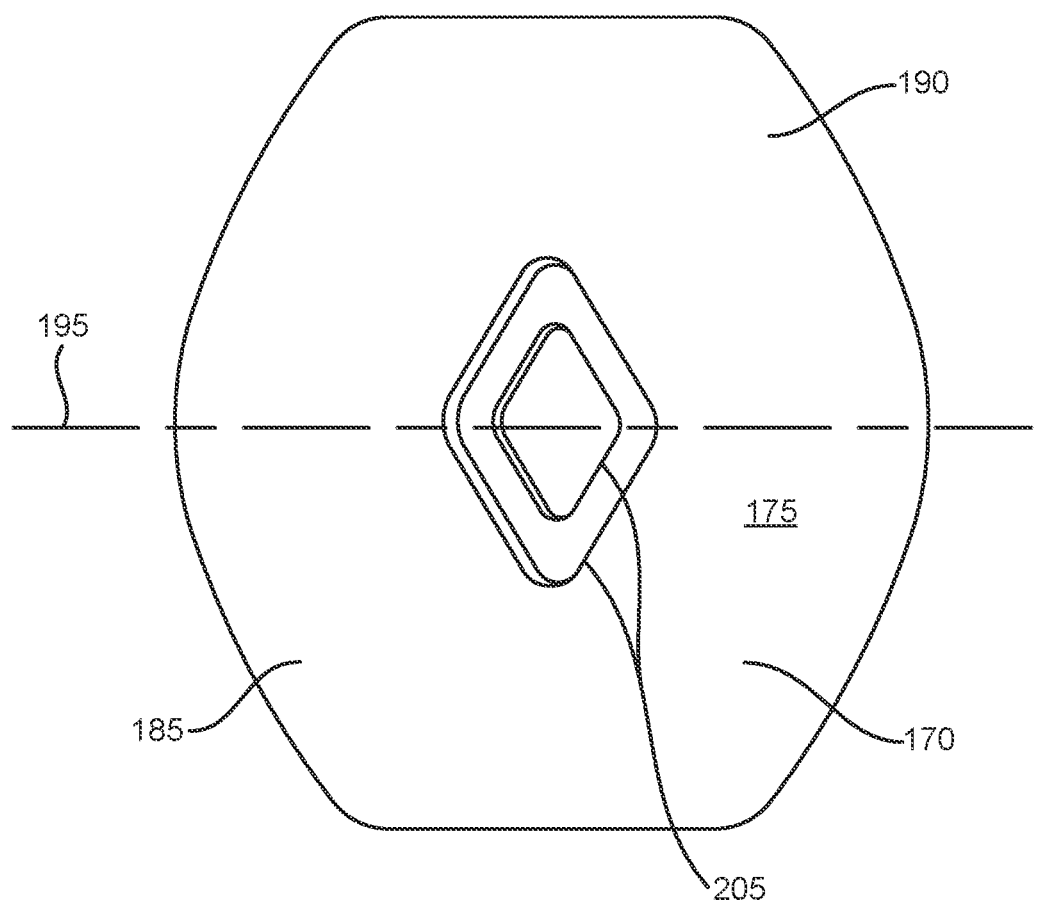
FIG. 14 shows a top view of the second surrounding sidewall alone showing in particular the aperture of the second surrounding sidewall therethrough in two places representing the folded over nature of the second surrounding sidewall as shown in FIG. 15.
Figure 15:
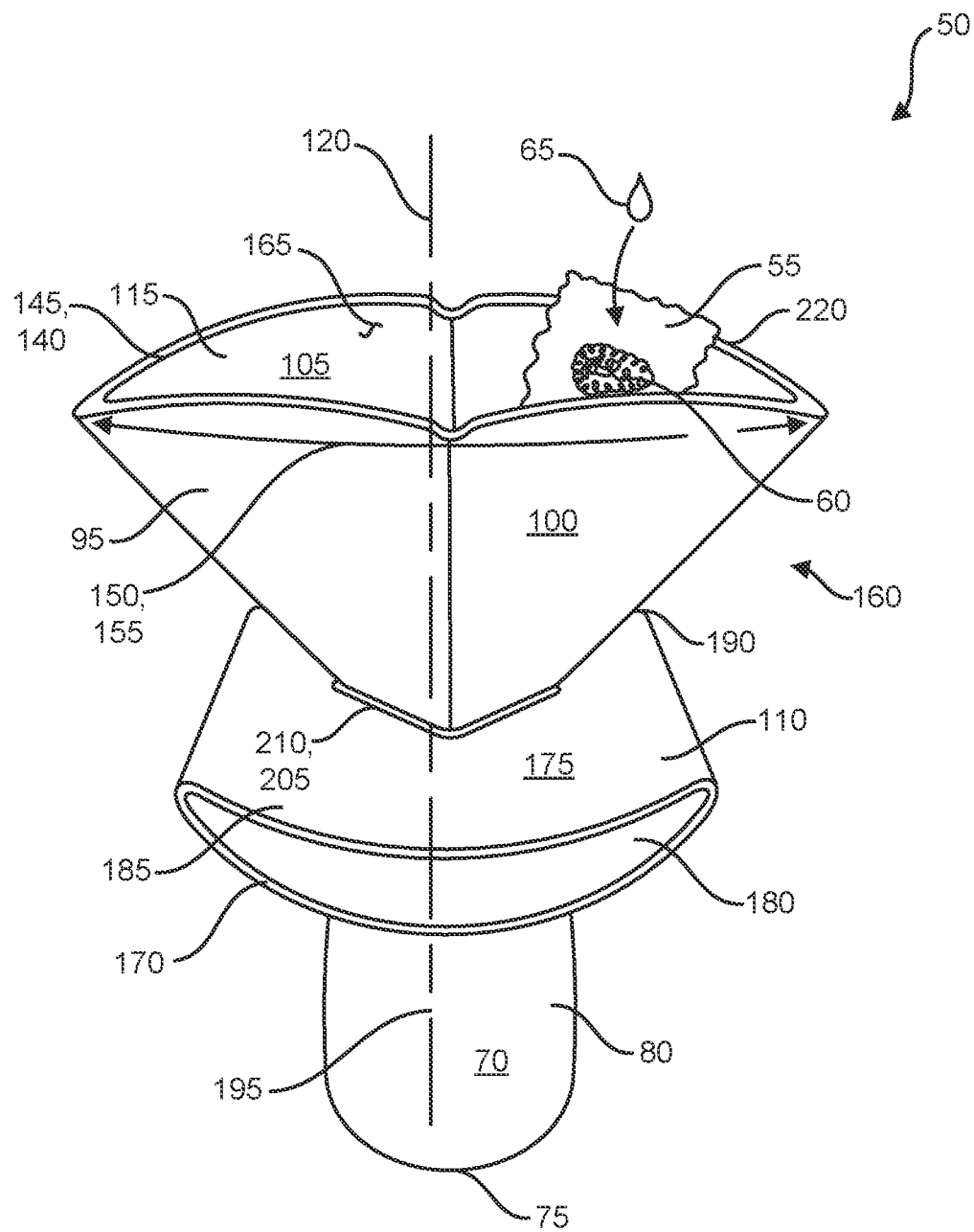
FIG. 15 shows a side elevation use view of the first and second surrounding sidewalls assembled to one another of the coffee filter holder, with the first surrounding sidewall inserted into the second surrounding sidewall with the first proximal end portion being received into the aperture of the second surrounding sidewall.

Moving onward, FIG. 14 shows a top view of the second surrounding sidewall 170 alone showing in particular the aperture 205 of the second surrounding sidewall 170 therethrough in two places representing the folded over nature of the second surrounding sidewall 170 as shown in FIG. 15. Next, FIG. 15 shows a side elevation use view of the first 95 and second 170 surrounding sidewalls assembled to one another of the coffee filter holder 50, with the first surrounding sidewall 95 inserted into the second surrounding sidewall 170 with the first proximal end portion 110 being received into the aperture 205 of the second surrounding sidewall 170.

Figure 16:
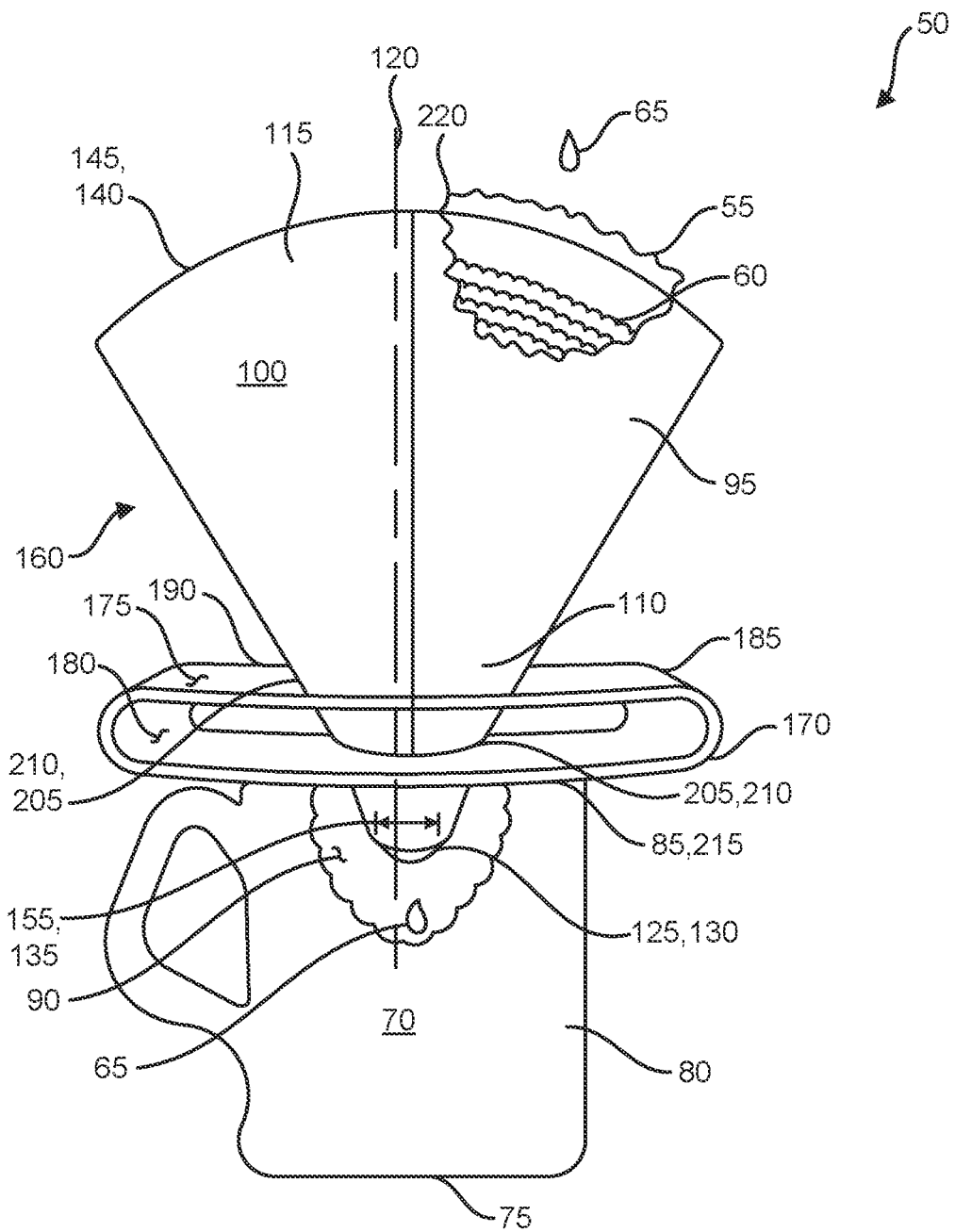
FIG. 16 shows a side elevation use view of the first and second surrounding sidewalls assembled to one another of the coffee filter holder, with the first surrounding sidewall inserted into the second surrounding sidewall with the first proximal end portion being received into the aperture of the second surrounding sidewall with a cutaway of the coffee cup showing the dripping of the hot water.

Continuing, FIG. 16 shows a side elevation use view of the first 95 and second 170 surrounding sidewalls assembled to one another of the coffee filter holder 50, with the first surrounding sidewall 95 inserted into the second surrounding sidewall 170 with the first proximal end portion 110 being received into the aperture 205 of the second surrounding sidewall 170 with a cutaway of the coffee cup 70 showing the dripping of the hot water 65.

Figure 17:
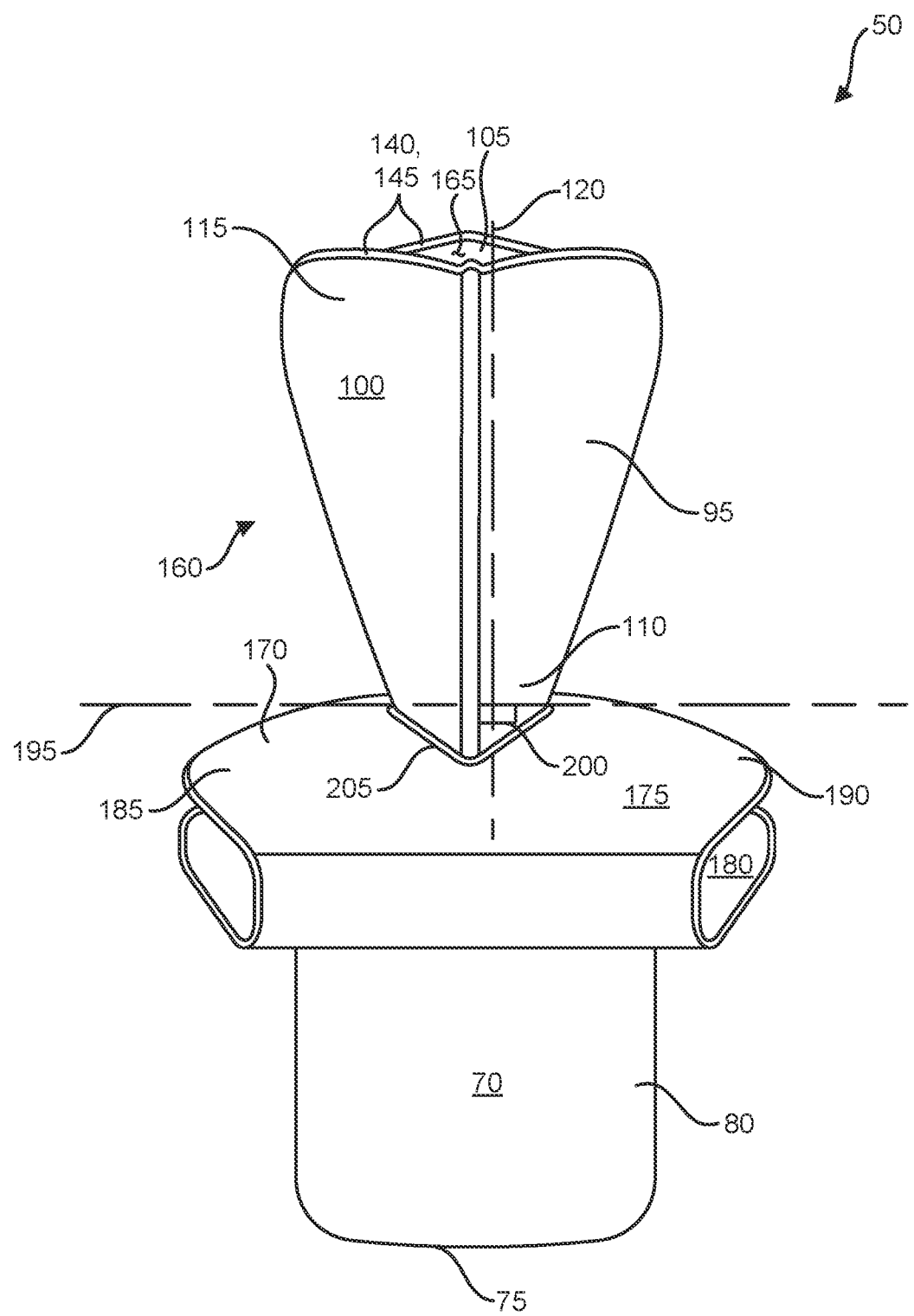
FIG. 17 shows a rotated side elevation use view from FIG. 15, with FIG. 17 showing the first and second surrounding sidewalls assembled to one another of the coffee filter holder, with the first surrounding sidewall inserted into the second surrounding sidewall with the first proximal end portion being received into the aperture of the second surrounding sidewall.
Figure 18:
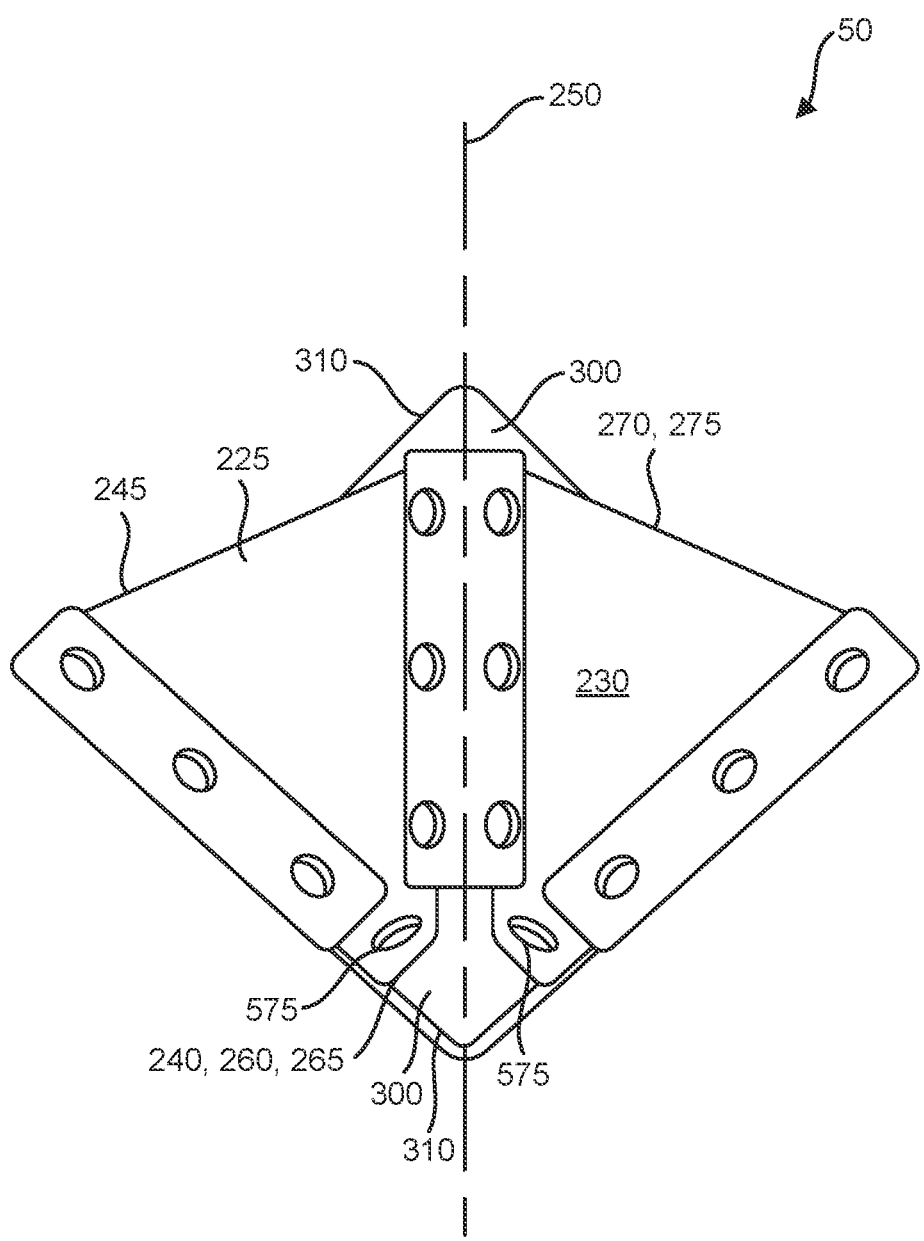
FIG. 18 shows a coffee filter holder with the third surrounding sidewall with the planar member that is inserted into the third surrounding sidewall for portability, see FIGS. 5 and 6 for the planar member removed from the third surrounding sidewall to be placed on the coffee cup for support of the third surrounding sidewall for the coffee filter holder in use.

Further, FIG. 17 shows a rotated side elevation use view from FIG. 15, with FIG. 17 showing of the first 95 and second 170 surrounding sidewalls assembled to one another of the coffee filter holder 50, with the first surrounding sidewall 95 inserted into the second surrounding sidewall 170 with the first proximal end portion 110 being received into the aperture 205 of the second surrounding sidewall 170. Next, FIG. 18 shows a coffee filter holder 50 with the third surrounding sidewall 225 with the planar member 300 that is inserted into the third surrounding sidewall 225 for portability, see FIGS. 5 and 6 for the planar member 300 removed from the third surrounding sidewall 225 to be placed on the coffee cup 70 for support of the third surrounding sidewall 225 for the coffee filter holder 50 in use.

Broadly in looking at FIGS. 11 to 17, a coffee filter holder 50 for supporting a coffee filter element 55 for use with a single serving coffee cup 70 that has a base 75, a coffee cup surrounding sidewall 80 extending from the base 75, and the coffee cup surrounding sidewall 80 terminating in a coffee cup rim 85 all defining a coffee cup interior 90, the coffee filter holder 50 comprising a first surrounding sidewall 95 including a first outer surface 100 and an opposing first inner surface 105, further the first surrounding sidewall 95 having a first proximal end portion 110 and an opposing first distal end portion 115 with a first longitudinal axis 120 spanning therebetween. Wherein the first proximal end portion 110 has a first proximal peripheral margin 125 that defines a first proximal termination 130 of the first surrounding sidewall 95, wherein the first proximal peripheral margin 125 has a first proximal peripheral distance 135, further the first distal end portion 115 has a first distal peripheral margin 140 that defines a first distal termination 145 of the first surrounding sidewall 95. Wherein the first distal peripheral margin 140 has a first distal peripheral distance 150, further the first distal peripheral distance 150 is greater 155 that the first proximal peripheral distance 135 thus forming a cone shape 160 for the first surrounding sidewall 95, wherein the first inner surface 105, the first proximal peripheral margin 125, and the first distal peripheral margin 140 all define a first surrounding sidewall interior 165.

Further, again looking at FIGS. 11 to 17, the coffee filter holder 50 includes a second surrounding sidewall 170 including a second outer surface 175 and an opposing second inner surface 180, further the second surrounding sidewall 170 having a second primary end portion 185 and an opposing second secondary end portion 190 with a second longwise axis 190 spanning therebetween. Wherein the first longitudinal axis 120 and the second longwise axis 195 are positioned perpendicular 200 to one another as the second surrounding sidewall 170 has an aperture 205 disposed therethrough the second surrounding sidewall 170 in two places along the first longitudinal axis 120 such that the first proximal end portion 110 is partially received 210 in the aperture 205. Wherein operationally a portion 215 of the second surrounding sidewall 170 second outer surface 175 rests 215 against the coffee cup rim 85 thus suspending the first surrounding sidewall 95 over the coffee cup interior 90 with the first proximal peripheral margin 125 adjacent to the coffee cup interior 90, wherein the coffee filter element 55 is placed 220 within the first surrounding sidewall interior 165 with ground coffee 60 placed within the coffee filter element 55 and hot water 65 poured over the ground coffee 60 to create a single cup of coffee.

Referring to FIGS. 4 to 6 and FIG. 18, a coffee filter holder 50 includes a third surrounding sidewall 225 including a third outer surface 230 and an opposing third inner surface 235, further the third surrounding sidewall 225 having a third proximal end portion 240 and an opposing third distal end portion 245 with a third longitudinal axis 250 spanning therebetween, wherein the third proximal end portion 240 has a third proximal peripheral margin 255 that defines a third proximal termination 260 of the third surrounding sidewall 225, wherein the third proximal peripheral margin 255 has a third proximal peripheral distance 265, further the third distal end portion 245 has a third distal peripheral margin 270 that defines a third distal termination 275 of the third surrounding sidewall 225. Wherein the third distal peripheral margin 270 has a third distal peripheral distance 280, further the third distal peripheral distance 280 is greater than 285 the third proximal peripheral distance 265 thus forming a cone shape 290 for the third surrounding sidewall 225, wherein the third inner surface 235, the third proximal peripheral margin 255, and the third distal peripheral margin 270 all define a third surrounding sidewall interior 295.

Referring again to FIGS. 4 to 6 and FIG. 18, the coffee filter holder 50 also includes a planar member 300 with a planar plane 305, the planar member 300 also having an outer perimeter 310 and a planar aperture 315 disposed therethrough the planar member 300, wherein the third longitudinal axis 250 and the planar plane 305 are positioned perpendicular 320 to one another, such that the third proximal end portion 240 is partially received 325 in the planar aperture 315. Wherein operationally a portion of the planar member 300 rests 330 against the coffee cup rim 85 thus suspending the third surrounding sidewall 225 over the coffee cup interior 90 with the third proximal peripheral margin 255 adjacent to the coffee cup interior 90, wherein the coffee filter element 55 is placed within the third surrounding sidewall interior 295 with ground coffee 60 placed within the coffee filter element 55 and hot water 65 poured over the ground coffee 60 to create a single cup of coffee.

Optionally, in referring again to FIGS. 4 to 6 and FIG. 18, for the coffee filter holder 50, wherein the third proximal end portion 240 can further comprise an interface aperture 575, wherein the interface aperture 575 partially receives a portion of the planar aperture 315 to operationally removably engage the third surrounding sidewall 225 to the planar member 300.

Another option, in referring again to FIGS. 4 to 6 and FIG. 18, for the coffee filter holder 50, wherein the third surrounding sidewall 225 can further comprise flexible corners that operationally allow a fold flat state of the third surrounding sidewall 225 that facilitates the planar member 300 to slip within the third surrounding interior 295 being adjacent to the third inner surface 235.

Referring to FIGS. 7 to 10, a coffee filter holder 50 includes a flexible fourth surrounding sidewall 335 including a fourth outer surface 340 and an opposing fourth inner surface 345, further the fourth surrounding sidewall 335 having a fourth proximal end portion 350 and an opposing fourth distal end portion 355 with a fourth longitudinal axis 360 spanning therebetween, wherein the fourth proximal end portion 350 has a fourth proximal peripheral margin 365 that defines a fourth proximal termination 370 of the fourth surrounding sidewall 335. Wherein the fourth proximal peripheral margin 365 has a fourth proximal peripheral distance 375, further the fourth distal end portion 355 has a fourth distal peripheral margin 380 that defines a fourth distal termination 385 of the fourth surrounding sidewall 335, wherein the fourth distal peripheral margin 380 has a fourth distal peripheral distance 390, further the fourth distal peripheral distance 390 is greater 395 than the fourth proximal peripheral distance 375 thus forming a cone shape 400 for the fourth surrounding sidewall 335.

Wherein the fourth inner surface 345, the fourth proximal peripheral margin 365, and the fourth distal peripheral margin 380 all define a fourth surrounding sidewall interior 405, wherein the fourth surrounding sidewall 335 forms a hexagonal pyramid 410 in shape that has six fold lines 415 in the fourth surrounding sidewall 335 with each fold line 415 running substantially parallel 420 to the fourth longitudinal axis 360, further at least one of the fold lines 415 has a projection of excess 430 fourth surrounding sidewall 335 outside of the hexagonal pyramid shape 410 to facilitate the fourth surrounding sidewall 335 to fold flat 425 for transportation and storage. Wherein operationally, a portion of the fourth proximal end portion 350 rests 435 against the coffee cup rim 85 thus suspending the fourth surrounding sidewall 335 over the coffee cup interior 90 with the fourth proximal peripheral margin 365 adjacent to the coffee cup interior 90, wherein the coffee filter element 55 is placed within the fourth surrounding sidewall interior 405 with ground coffee 60 placed within the coffee filter element 55 and hot water 65 poured over the ground coffee 60 to create a single cup of coffee.

Optionally, in referring to FIGS. 7 to 10, for the coffee filter holder 50, wherein the projection of excess 430 further comprises four projection of excess 430 sections having one on each corner of the flexible fourth surrounding sidewall 335 to operationally enable a symmetric fold flat state 425 and hexagonal pyramid shape 410 of the fourth surrounding sidewall 335.

Referring to FIGS. 1 to 3, a coffee filter holder 50 includes at least three planar elements 440 that each include a lengthwise axis 445, with each planar element 440 further including an outer perimeter 450 that forms a polygon shape 455, wherein the outer perimeter 450 includes a partial first slot 460 therethrough the planar element 440 wherein a first length 465 of the partial first slot 460 is substantially parallel 470 to the lengthwise axis 445, further the outer perimeter 450 includes an oppositely disposed partial second slot 475 with a second length 480 of the partial second slot 475 positioned at an acute angle 485 to the lengthwise axis 445. Wherein the first slot 460 and said second slot 475 are engaged 495 to one another on separate planar elements such that a fifth surrounding sidewall 490 is formed by at least three of the planar elements 440, the fifth surrounding sidewall including a fifth outer surface 500 and an opposing fifth inner surface 505.

Further the fifth surrounding sidewall 490 having a fifth proximal end portion 510 and an opposing fifth distal end portion 515 with a fifth longitudinal axis 520 spanning therebetween, wherein the fifth proximal end portion 510 has a fifth proximal peripheral margin 525 that defines a fifth proximal termination 530 of the fifth surrounding sidewall 490. Wherein the fifth proximal peripheral margin 525 has a fifth proximal peripheral distance 535, further the fifth distal end portion 515 has a fifth distal peripheral margin 540 that defines a fifth distal termination 545 of the fifth surrounding sidewall 490, wherein the fifth distal peripheral margin 540 has a fifth distal peripheral distance 550, further the fifth distal peripheral distance 550 is greater 560 that the fifth proximal peripheral distance 535 thus forming a cone shape 555 for the fifth surrounding sidewall 490. Wherein the fifth inner surface 505, the fifth proximal peripheral margin 525, and the fifth distal peripheral margin 540 all define a fifth surrounding sidewall 490 interior 565, wherein operationally a portion of the fifth proximal end portion 510 rests 570 against the coffee cup rim 85 thus suspending the fifth surrounding sidewall 490 over the coffee cup interior 90 with the fifth proximal peripheral margin 525 adjacent to the coffee cup interior 90, wherein the coffee filter element 55 is placed within the fifth surrounding sidewall interior 565 with ground coffee 60 placed within the coffee filter element 55 and hot water 65 poured over the ground coffee 60 to create a single cup of coffee.

Optionally, in referring to FIGS. 1 to 3, for the coffee filter holder 50, wherein the first slot 460 and the second slot 475 that are engaged to one another on separate planar elements 440 are sized and configured to be removably engageable to one another to operationally facilitate each planar element 440 being separated to allow compact storage of at least three planar elements 440 being flat stacked upon one another with the fifth outer surfaces 500 and the fifth inner surfaces 505 being adjacent to one another. Further optionally, in referring to FIGS. 1 to 3, for the coffee filter holder 50, can further comprise a fourth planar element 440 to form the fifth surrounding sidewall 490 as a four-sided fifth surrounding sidewall 490.

CONCLUSION

Accordingly, the present invention of a coffee filter holder has been described with some degree of particularity directed to the embodiments of the present invention. It should be appreciated, though; that the present invention is defined by the following claims construed in light of the prior art so modifications of the changes may be made to the exemplary embodiments of the present invention without departing from the inventive concepts contained therein.

The invention claimed is:

1. A coffee filter holder for supporting a coffee filter for use with a single serving coffee cup that has a base, a coffee cup surrounding sidewall extending from the base, and the coffee cup surrounding sidewall terminating in a coffee cup rim all defining a coffee cup interior, said coffee filter holder comprising:
a third surrounding sidewall including a third outer surface and an opposing third inner surface, further said third surrounding sidewall having a third proximal end portion and an opposing third distal end portion with a third longitudinal axis spanning therebetween, wherein said third proximal end portion has a third proximal peripheral margin that defines a third proximal termination of said third surrounding sidewall, wherein said third proximal peripheral margin has a third proximal peripheral distance, further said third distal end portion has a third distal peripheral margin that defines a third distal termination of said third surrounding sidewall, wherein said third distal peripheral margin has a third distal peripheral distance, further said third distal peripheral distance is greater than said third proximal peripheral distance thus forming a cone shape for said third surrounding sidewall, wherein said third inner surface, said third proximal peripheral margin, and said third distal peripheral margin all define a third surrounding sidewall interior; and
a planar member with a planar plane, said planar member also having an outer perimeter and a planar aperture disposed therethrough said planar member, wherein said third longitudinal axis and said planar plane are positioned perpendicular to one another, such that said third proximal end portion is partially received in said planar aperture, wherein operationally a portion of said planar member rests against the coffee cup rim thus suspending said third surrounding sidewall over the coffee cup interior with said third proximal peripheral margin adjacent to the coffee cup interior, wherein the coffee filter element is placed within said third surrounding sidewall interior with ground coffee placed within the coffee filter element and hot water poured over the ground coffee to create a single cup of coffee.

2. The coffee filter holder according to claim 1 wherein said third proximal end portion further comprises an interface aperture, wherein said interface aperture partially receives a portion of said planar aperture to operationally removably engage said third surrounding sidewall to said planar member.

3. The coffee filter holder according to claim 1 wherein said third surrounding sidewall further comprises flexible corners that operationally allow a fold flat state of said third surrounding sidewall that facilitates said planar member to slip within said third surrounding interior being adjacent to said third inner surface.

4. A coffee filter holder for supporting a coffee filter for use with a single serving coffee cup that has a base, a coffee cup surrounding sidewall extending from the base, and the coffee cup surrounding sidewall terminating in a coffee cup rim all defining a coffee cup interior, said coffee filter holder comprising:
a flexible fourth surrounding sidewall including a fourth outer surface and an opposing fourth inner surface, further said fourth surrounding sidewall having a fourth proximal end portion and an opposing fourth distal end portion with a fourth longitudinal axis spanning therebetween, wherein said fourth proximal end portion has a fourth proximal peripheral margin that defines a fourth proximal termination of said fourth surrounding sidewall, wherein said fourth proximal peripheral margin has a fourth proximal peripheral distance, further said fourth distal end portion has a fourth distal peripheral margin that defines a fourth distal termination of said fourth surrounding sidewall, wherein said fourth distal peripheral margin has a fourth distal peripheral distance, further said fourth distal peripheral distance is greater that said fourth proximal peripheral distance thus forming a cone shape for said fourth surrounding sidewall, wherein said fourth inner surface, said fourth proximal peripheral margin, and said fourth distal peripheral margin all define a fourth surrounding sidewall interior, wherein said fourth surrounding sidewall forms a hexagonal pyramid in shape that has six fold lines in said fourth surrounding sidewall with each said fold line running substantially parallel to said fourth longitudinal axis, further at least one of said fold lines has a projection of excess fourth surrounding sidewall outside of said hexagonal pyramid shape to facilitate said fourth surrounding sidewall to fold flat for transportation and storage, wherein operationally a portion of said fourth proximal end portion rests against the coffee cup rim thus suspending said fourth surrounding sidewall over the coffee cup interior with said fourth proximal peripheral margin adjacent to the coffee cup interior, wherein the coffee filter element is placed within said fourth surrounding sidewall interior with ground coffee placed within the coffee filter element and hot water poured over the ground coffee to create a single cup of coffee.

5. The coffee filter holder according to claim 4 wherein said projection of excess further comprises four projection of excess sections having one on each corner of said flexible fourth surrounding sidewall to operationally enable a symmetric fold flat state and hexagonal pyramid shape of said fourth surrounding sidewall.

6. A coffee filter holder for supporting a coffee filter for use with a single serving coffee cup that has a base, a coffee cup surrounding sidewall extending from the base, and the coffee cup surrounding sidewall terminating in a coffee cup rim all defining a coffee cup interior, said coffee filter holder comprising:

at least three planar elements that each include a lengthwise axis, with each planar element further including an outer perimeter that forms a polygon shape, wherein said outer perimeter includes a partial first slot therethrough said planar element wherein a first length of said partial first slot is substantially parallel to said lengthwise axis, further said outer perimeter includes an oppositely disposed partial second slot with a second length of said partial second slot positioned at an acute angle to said lengthwise axis, wherein said first slot and said second slot are engaged to one another on separate planar elements such that a fifth surrounding sidewall is formed by at least three of said planar elements, said fifth surrounding sidewall including a fifth outer surface and an opposing fifth inner surface, further said fifth surrounding sidewall having a fifth proximal end portion and an opposing fifth distal end portion with a fifth longitudinal axis spanning therebetween, wherein said fifth proximal end portion has a fifth proximal peripheral margin that defines a fifth proximal termination of said fifth surrounding sidewall, wherein said fifth proximal peripheral margin has a fifth proximal peripheral distance, further said fifth distal end portion has a fifth distal peripheral margin that defines a fifth distal termination of said fifth surrounding sidewall, wherein said fifth distal peripheral margin has a fifth distal peripheral distance, further said fifth distal peripheral distance is greater than said fifth proximal peripheral distance thus forming a cone shape for said fifth surrounding sidewall, wherein said fifth inner surface, said fifth proximal peripheral margin, and said fifth distal peripheral margin all define a fifth surrounding sidewall interior, wherein operationally a portion of said fifth proximal end portion rests against the coffee cup rim thus suspending said fifth surrounding sidewall over the coffee cup interior with said fifth proximal peripheral margin adjacent to the coffee cup interior, wherein the coffee filter element is placed within said fifth surrounding sidewall interior with ground coffee placed within the coffee filter element and hot water poured over the ground coffee to create a single cup of coffee.

7. The coffee filter holder according to claim 6 wherein said first slot and said second slot that are engaged to one another on separate planar elements are sized and configured to be removably engageable to one another to operationally facilitate each said planar element being separated to allow compact storage of said least three planar elements being flat stacked upon one another with said fifth outer surfaces and said fifth inner surfaces being adjacent to one another.

8. The coffee filter holder according to claim 6 further comprising a fourth planar element to form said fifth surrounding sidewall as a four-sided fifth surrounding sidewall.

\* \* \* \* \*